(12) United States Patent
Ellis

(10) Patent No.: US 9,062,986 B1
(45) Date of Patent: Jun. 23, 2015

(54) GUIDED MOVEMENT PLATFORMS

(71) Applicant: Christ G. Ellis, Minneapolis, MN (US)

(72) Inventor: Christ G. Ellis, Minneapolis, MN (US)

( * ) Notice: Subject to any disclaimer, the term of this patent is extended or adjusted under 35 U.S.C. 154(b) by 0 days.

(21) Appl. No.: 14/269,161

(22) Filed: May 4, 2014

Related U.S. Application Data

(60) Provisional application No. 61/820,392, filed on May 7, 2013, provisional application No. 61/930,660, filed on Jan. 23, 2014.

(51) Int. Cl.
| | | |
|---|---|---|
| G01C 21/00 | (2006.01) | |
| G01C 21/36 | (2006.01) | |
| A61H 3/06 | (2006.01) | |
| G01S 13/93 | (2006.01) | |

(52) U.S. Cl.
CPC ............... *G01C 21/36* (2013.01); *A61H 3/061* (2013.01); *G01C 21/00* (2013.01); *A61H 3/068* (2013.01); *G01S 13/931* (2013.01)

(58) Field of Classification Search
USPC ........................................................ 701/469
See application file for complete search history.

(56) References Cited

U.S. PATENT DOCUMENTS

| | | | |
|---|---|---|---|
| 5,973,618 A | 10/1999 | Ellis | |
| 6,218,964 B1 | 4/2001 | Ellis | |
| 6,356,210 B1* | 3/2002 | Ellis | 340/990 |
| 6,556,148 B2 | 4/2003 | Ellis | |
| 7,042,345 B2 | 5/2006 | Ellis | |
| 8,271,449 B2* | 9/2012 | Jung et al. | 707/661 |
| 8,355,888 B2* | 1/2013 | Chernoguz et al. | 702/160 |
| 2002/0126022 A1 | 9/2002 | Ellis | |
| 2003/0154017 A1 | 8/2003 | Ellis | |
| 2004/0083035 A1 | 4/2004 | Ellis | |
| 2004/0145496 A1 | 7/2004 | Ellis | |
| 2007/0005245 A1* | 1/2007 | Ellis | 701/213 |
| 2008/0040951 A1* | 2/2008 | Kates | 36/136 |
| 2008/0266106 A1* | 10/2008 | Lim et al. | 340/572.7 |
| 2009/0005973 A1* | 1/2009 | Salo et al. | 701/209 |
| 2009/0032590 A1* | 2/2009 | Hopkins | 235/385 |
| 2010/0004860 A1* | 1/2010 | Chernoguz et al. | 701/217 |
| 2010/0176952 A1* | 7/2010 | Bajcsy et al. | 340/573.1 |
| 2011/0148652 A1* | 6/2011 | Kim et al. | 340/691.1 |
| 2014/0100771 A1* | 4/2014 | Ekpar et al. | 701/408 |

* cited by examiner

*Primary Examiner* — Hussein A. Elchanti

(57) ABSTRACT

Wireless sensor network motes and radar & sensor-based systems receive sensed data, compare it to a predetermined standard and generate a signal to deploy a corresponding response.

16 Claims, 11 Drawing Sheets

GUIDED MOVEMENT PLATFORMS

This application claims the benefit under 35 U.S.C. 119(e) of U.S. provisional application Nos. 61/820,392 filed May 7, 2013 and 61/930,660 filed Jan. 23, 2014, both of which provisional applications are hereby incorporated by reference in their entireties into this application.

FIELD OF THE INVENTION

The present invention, Guided Movement Platforms, relates to helping the visually impaired, dementia patients and the elderly in navigating the environment.

BACKGROUND OF THE INVENTION

Technology has by-passed an important segment of our society. This is an effort to help. Proper tools can profoundly influence the potential of the visually impaired, dementia patients and the elderly. Apprehension, ambition, difficulty of movement, poverty, and unemployment plead for innovation.

Guided Movement Platforms is designed to provide guided movement for the visually impaired, dementia patients and the elderly by responding to sensed information, verbal communication, and GPS guidance. Guided Movement Platforms, an advanced version of U.S. Pat. No. 5,973,618, gently guides the impaired in navigating curbs, inclines & declines, dips & rises, obstacles, low hanging hazards, following electronic paths, maintaining balance, etc.

SUMMARY OF THE INVENTION

How Sensed Data is Received and Corresponding Response is Deployed
  System 1: Wireless Sensor Network Motes+GPS
  Sensed data received ("visible" to all enabled motes), transmits a radio signal to a transducer which electronically converts the radio signal into electromagnetic energy. A processor compares the data received with a predetermined standard and deploys an action to:
    transmit images to other enabled devices.
    select an alternative path, circumventing a detected hazard;
    preempt a set of traffic lights when danger is imminent;
    initiate a counter-thrust to assist in maintaining balance.
    identify money, medication, clothing, date & time, etc.
    etc.
  System 1 is shown in FIG. 11A.
  System 2: Radar and Sensor-Based Systems+GPS
  Sensed data received from a transponder (an integrated receiver and transmitter of radio signals) is transmitted to a transducer which electronically converts the radio signal into electromagnetic energy. A processor compares the data received with a predetermined standard and deploys an action to:
    transmit images to other enabled devices.
    select an alternative path, circumventing a detected hazard;
    preempt a set of traffic lights when danger is imminent;
    initiate a counter-thrust to assist in maintaining balance.
    identify money, medication, clothing, date & time, etc.
    etc.
  System 2 is shown in FIG. 11B.
  Understanding the Science Behind Guided Movement Platforms
    Wireless Sensor Network Motes
    "Wireless Sensor Network Motes consist of spatially distributed autonomous devices. The idea is to combine communication, computation, and sensing into tiny single packages. A single chip of a wireless mote comprises some or all of the following components: memory (to store data)—A/D converter (to digitize and read sensed data)—computer (to connect a mote with a radio link)—radio transmitter—GPS sensors—battery—antenna. In mass production, it is estimated the cost of a chip will be less than one dollar."

Wireless sensor network motes, radar & sensor-based systems, GPS, and RFID work in combination to monitor physical and environmental conditions; to detect, identify, locate, and display sensed and imaged scenes, and to convert information into verbal communication.

Each sensor node is composed of a microcontroller, transceiver, memory, power source and one or more sensors, either internal or external to the sensor board. The motes function within the network and typically fulfill one of two purposes:—either data-logging, processing (and/or transmitting) sensor information from the environment, or acting as a gateway in the adhoc wireless network formed by all the sensors to pass data back to a (usually unique) collection point.

Automatic processing of data is used to reduce complexity and to fuse information from multiple sensors. Increased reliability can be achieved by accepting and attaching other platforms. Redundant transmissions may require more available plug-ins.
  Radar & Sensor-Based Systems
  Radar and Sensor-Based Systems work in combination and comprise: microwave radar, millimeter-wave radar, laser radar, ultrasound, video image processing, infrared imaging, infrared illumination, ultraviolet illumination, etc. Transmitted electromagnetic energy detects energy reflected by objects and converts invisible images into visible images.

In radar and sensor-based systems, the processor is designed and programmed to receive real-time data (analog or digital) from transducers, sensors, and other data sources that monitor a physical process. The processor can also generate signals to elements that control a process. That is, a processor receives sensed data from a sensor(s), compares the data with predetermined standards, and then generates a signal that:
    transmits images to other enabled devices.
    transmits information to other enabled devices.
    selects an alternative path.
    preempts a set of traffic lights.
    initiates a counter-thrust to assist in maintaining balance.
    visually enhances images;
    identifies money, medication, clothing, date & time, etc.

Automated contact from more than one search radar with common fields of view and cell phone technology convert and combine sensed and imaged scenes into integrated, dynamic, visible and audible displays.

Laser-radar flags hazards and obstacles, forming images by scanning the environment in both the azimuth and elevation directions, and assists in navigating curbs, inclines & declines, dips & rises, low hanging hazards, etc.

Computer vision algorithms analyze camera images and extract information that can be used for various tasks such as recognizing objects and detecting motion.

Intelligent video performs video analysis and automated video monitoring. It identifies objects, analyzes motion and extracts video intelligence—issuing real-time alerts when exceptions occur.

Video & digital image processing systems recognize traffic signals and advise when it is safe for an impaired person (child, senior, anyone who carries or wears on-person sensors, including sensors and processors built into clothing and footwear) to cross.

Sensors include sensors for temperature, light, sound, position, acceleration, vibration, stress, weight, pressure, humidity, GPS, magnetic, etc.

Ultrasound Imaging (Sonography) uses high frequency sound waves instead of ionizing radiation. When the sound waves strike specific surfaces, echoes are produced. The echoes are detected by a transducer and are then electronically converted into an anatomic image that is displayed on a video screen. The image can be recorded on film or video tape, and can be done in a real-time format. Sonography can be used for the detection, identification, and location of a visually impaired individual or lost dementia patient.

An advantage of Continuous Wave Radar is its extreme precision and its ability to warn when danger is imminent. Exploiting the Doppler principle, it can anticipate obstacles and hazards several feet ahead and trigger changes in direction" while still targeting the requested destination.

Upon receiving a designated signal, a tracking system emits a radio signal of its own and that is used for the detection, identification, and location of visually impaired and dementia patients (transmitter and transponder). GPS provides verbal and guided directions to desired destinations.

GPS/GPS-Based Computer Representation/GPS Steering

GPS receiver provides its user with four main things: location, distance and directional information, tracking and route creation. Between 24 and 32 satellites orbit the Earth, and these satellites provide the answer to the GPS receiver's asked question, "Where am I?" The satellites calculate this through a process called trilateration. Receivers lock signals with several different satellites orbiting the Earth, and based on the time it took those signals to reach the different satellites, a calculation is made about the receiver's location on Earth. Long story short, you look down at your receiver and see exactly where you are on a digital map.

GPS technology enables you to create a path to walk or a route to travel in one pass. Laying a track is an important GPS receiver skill. You can use your GPS to leave a virtual trail, which allows you to follow your trail out if you become lost. When you use the tracking feature, you don't need to manually enter the track points, the GPS will automatically mark them for you at the distance you specify before your trip.

Infrared technology consists of "short audio signals sent by invisible infrared light beams from permanently installed transmitters to a hand-held receiver that decodes the signal and delivers the voice message through its speaker or headset. It identifies the landmarks around the individual and sends him/her short messages telling what's ahead.

GPS-compatible Cell Phone can be one unit with different levels of complexity for the phone's software (i.e. the amount of features available), which would be decided upon by the users.

GPS-Steering enhances visibility when snow, rain, or fog obscures the actual view. If the visually impaired strays from the guided path, GPS-Steering gently guides the individual back to the on-course path.

GPS Steering guides the visually impaired while avoiding obstacles.

Cell Phone Technology

Cell phone software can be uploaded to individual phones and address some of the concerns that the blind and partially sighted have; to convert sensed data into verbal communication; to speak to users in several different languages; to allow them to listen to voice mails and even write and send e-mails.

Cell phones are connected to a server that allows for continuous update to most recent maps;

GPS-compatible Cell Phones & PDA's (personal digital assistant) contain software products that provide verbal instructions;

GPS technology and PDS afford personal navigation;

GPS-Steering automatically guides the visually impaired.

GPS-Steering enhances visibility when snow, rain, or fog obscures the actual view. If the visually impaired strays from the guided path, GPS-Steering gently guides the individual back to the on-course path.

The GPS-compatible Cell Phone is the single most valuable piece of technology for the blind.

Java runs on nearly every modern cell phone.

Bluetooth Technology

The Bluetooth core system consists of a radio frequency transceiver, baseband, and protocol stack. The system offers services that enable the connection of devices and the exchange of a variety of classes of data between these devices. Many features of the core specification are optional, allowing product differentiation. Bluetooth profiles are definitions of possible applications and specify general behaviors that Bluetooth enabled devices use to communicate with other Bluetooth devices.

RFID Technology

An RFID system (radio frequency identification) requires the presence of a microchip, an antenna, and a reader, where the reader sends out electromagnetic waves which are received by the antenna and converted to digital data by the microchip. That is, sensed data received, the Intelligent Pointer, with predetermined standards, sends identification data to the antenna, which converts the data into visually enhanced images, and audibly describes the different foods and their respective positions on the plate (or table) of the visually impaired, The Intelligent Pointer, which includes GPS+CELL PHONE+RFID, reads RFID (Radio Frequency Identification) tags, facilitates the identifying of money, taking of medication, matching clothing, cooking, telling time, etc. It also generates a signal to alert the visually impaired of the presence of nearby stairs; do they go up, down or both; does a railing exist; and if a railing exists, is it on the left side or right. It also warns, advises, and/or initiates the circumventing of obstacles around the house and elsewhere.

RFID technology has two components—the reader and the tag. The reader has two parts—a transceiver and an antenna. The transceiver generates a weak radio signal that may have a range from a few feet to a few yards. The signal is necessary to awaken the RFID tag and is transmitted through the antenna. The signal itself is a form of energy that can be used to power the tag. This whole process can take as little as a few milliseconds.

RFID tags can be positioned in public locations so as to identify the meat section, candy aisle, and vegetable stands at grocery stores; the teller booth, the auto ticket machine, the stairs, train platforms, the stalls in public restrooms, etc.

An RFID tag can be as small as a grain of black pepper and be embedded right into a product's packaging, or the product itself.

The transponder is the part of the RFID tag that converts that radio frequency into usable power, as well as sends and receives messages.

Components of Guided Movement Platforms

Intelligent Pointer

The Intelligent Pointer, a removable attachment, senses, visually enhances, and audibly describes the foods and their respective positions on the plate of the visually impaired; also reads RFID (Radio Frequency Identification) tags, facilitating the identifying of money, taking of medication, matching clothing, cooking, telling time, etc.

Intelligent Walking Stick

The Intelligent Walking Stick is designed to provide guided movement for the visually impaired, dementia patients and the elderly by responding to sensed information, verbal communication, and GPS guidance.

Wireless sensor network motes, radar & sensor-based systems, and GPS work in combination to monitor physical and environmental conditions; to detect, identify, locate, and display sensed and imaged scenes, and to convert information into verbal communication.

A motorized cane gently pulls, pushes, and steers the impaired individual in reaching requested destinations, safely crossing streets, navigating curbs, inclines & declines, dips & rises, obstacles & hazards, low hanging hazards, following electronic paths, maintaining balance (please see "Maintaining Balance"), etc;

It also generates a signal to alert the visually impaired of the presence of nearby stairs; do they go up, down or both; does a railing exist; and if a railing exists, is it on the left side or right. It also warns, advises, and/or initiates the circumventing of obstacles around the house and elsewhere.

The Intelligent Walking Stick:
1. warns when a vehicle is dangerously close;
2. warns (advises) surrounding vehicles when an impaired person is crossing the street;
3. generates dynamic images that overlay on glasses, goggles, shields, and screens;
4. preempts a set of traffic lights when danger is imminent;
5. transmits images and audible information, such as street names;
6. activates an automatic emergency alert component;
7. emits a radio signals for the detection, identification, and location of visually impaired and dementia patients. GPS provides verbal and guided directions to the desired destinations;
8. converts sensed and imaged scenes into dynamic, visible & audible displays, providing information & "sight";
9. performs video analysis & automated video monitoring in recognizing traffic signals and advising when it is safe for an impaired person (individual who carries or wears on-person sensors) to cross;
10. employs computer vision algorithms to analyze camera images and extract information;
11. activates automatic processing of data;
12. employing GPS technology, a path or map to walk or a route to travel and then to return home can be created in one pass. Whether for the blind and visually impaired or for dementia patients, a guided round trip affords impaired individuals a way to exercise, a way to walk for pleasure, and a safe way to return home. No intervention is required.
13. selects an alternative path to circumvent hazards sensed several feet ahead by automatically initiating necessary changes in direction. After evading the hazard(s), continues targeting the originally requested destination, recalibrating as necessary. If an acceptable path is not detected, the motorized wheel will come to a stop;
14. initiates small, repeat pulsations to assist in maintaining balance (please see "Maintaining Balance");
15. initiates a counter-thrust to assist in maintaining balance (please see "Maintaining Balance");
16. initiates and advises appropriate, predetermined and computer learned actions in response to sensed information and verbal instructions;
17. alerts surrounding vehicles when impaired individual is crossing a street or is about to cross;
18. detects, identifies, locates, and displays sensed and imaged scenes;
19. converts information into verbal communication;
20. requires more than one functioning camera when the cane is in motion;
21. predicts, detects, and circumvents hazards and obstacles;
22. produces dynamic images that overlay on glasses, goggles, shields, and screens;
23. assists in maintaining balance.
24. disallows tampering with functions of the intelligent walking stick;
25. safety and guidance features are also comprised in Wheel Chairs, Walkers, and On-Person Sensors;

Accepting and Attaching Other Platforms
26. to upload bus & train routes through a server onto one's personal computer;
27. to find private residences, overnight accommodations, attractions, and restaurants;
28. to receive instantaneous information regarding one's whereabouts;
29. to record voice memos, check e-mail, listen to music, etc.

It should soon be possible to match each individual's needs to his/her personal Guided Movement Platforms.

Construction of the Intelligent Walking Stick

Wheel

The motorized wheel must spin in universal directions.

The motorized wheel should be approximately 2¼" in width (to add stability for those needing a regular cane and the Intelligent Walking Stick simultaneously).

Requires a wheel large enough to move through light underbrush.

Requires a wheel soft enough to absorb most surface roughness and noise.

The motorized wheel must be strong enough to support an individual as the spin momentum from a counter-thrust moves the sensed off-balance individual and the cane itself (180 degrees or ½ turn) to an upright position and stops. (Please see section on "Maintaining Balance".

Frame

Small, Repeated Pulsations:
When the cane of the visually impaired moves too far from upright, but before reaching the sensed likelihood of falling, a pulsation is triggered in the handle of the cane, urging a move to a more upright stance. That is, a processor receives the radar sensed data from a sensor(s), compares the data with predetermined standards, and initiates pulsations in the handle of the cane.

Counter-Thrust—Optional:
Algorithms interpret the risk of falling as the visually impaired leans more and more away from upright (beyond the pulsation warnings) and determine when to initiate a counter-thrust and the momentum required. The processor compares the data with predetermined standards, and initiates a counter-thrust. The spin direction of the motorized wheel is reversed, slowing or thwarting an individual's fall. That is, the cane spins the off-balance individual and the cane itself 180 degrees or ½ turn to an upright position and stops.

The frame must be strong enough to support an individual as the spin momentum from a counter-thrust moves the sensed off-balance individual and the cane itself (180 degrees or ½ turn) to an upright position. (Please see section on "Maintaining Balance".)

Frames must be available in different sizes or adjustable in size.

A light on the Intelligent Walking Stick that shines on the ground will signal the presence of a visually impaired individual and allow the individual easier, safer movement.

A flashing light from the cane will signal a visually impaired individual is crossing the street.

Features of the cane requiring manual action by the impaired individual should be positioned for easy access with appropriate lighting.

Power to light and/or sound is connected to two separate on/off switches. Power always comes on when the cane is first activated.

Battery must be light weight, able to function most of the day, and charged on a 120 volt AC outlet.

The cane should be able to stand upright when not in use.

DESCRIPTION

Figure 1:
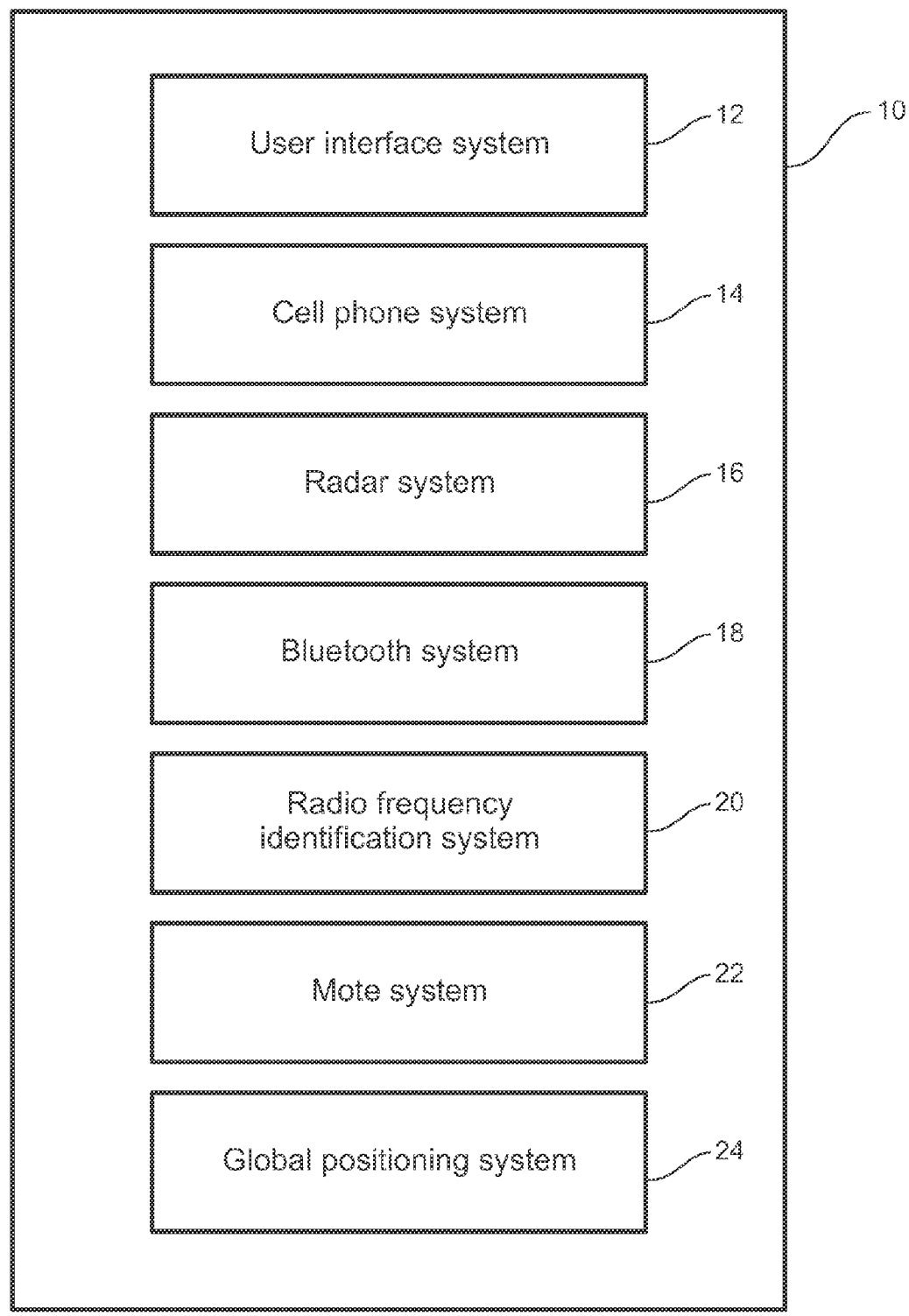
FIG. 1 is a diagrammatic view of the present guided movement platform.

A feature of the present invention is a guided movement platform.

Another feature of the present invention is the provision in a guided movement platform, of a cell phone system. The cell phone system includes a cell phone processor that converts information received from at least one of the other systems into a verbal communication. The cell phone system includes a cell phone processor that converts a verbal communication into a form of communication that deploys an action with at least one of the other systems. The cell phone system is configured to automatically receive mapping information on the environment of the pedestrian user.

Another feature of the present invention is the provision in a guided movement platform, of a radar system. The radar system includes a transponder, a transducer, and a radar processor, wherein radar signal data received by the radar system is compared with predetermined standards to deploy an action with at least one of the other systems.

Another feature of the present invention is the provision in a guided movement platform, of a Bluetooth system. The Bluetooth system manages communication between at least two of the other systems.

Another feature of the present invention is the provision in a guided movement platform, of a radio frequency identification system. The radio frequency identification system includes a reader for reading information found on a tag in the environment of the pedestrian user. The radio frequency identification system then communicates such information received from the tag to at least one of the other systems.

Another feature of the present invention is the provision in a guided movement platform, of a mote system. The mote system includes a sensor node having a microcontroller, transceiver, external memory, power source, and at least one sensor.

Another feature of the present invention is the provision in a guided movement platform, of a global positioning system.

Another feature of the present invention is the provision in a guided movement platform, of a user interface system that is an interface between the pedestrian user and the other systems. The pedestrian user interacts with the user interface system by at least one of speech, hearing, touch, and sight.

Another feature of the present invention is the provision in a guided movement platform, of at least one of the systems having a processor or computer.

Another feature of the present invention is the provision in a guided movement platform, of each of the systems being in communication with at least one of the other systems.

Another feature of the present invention is the provision in a guided movement platform, of at least one of said systems being engaged on a walking stick.

Another feature of the present invention is the provision in a guided movement platform, of at least one of said systems being engaged on a wheelchair.

Another feature of the present invention is the provision in a guided movement platform, of at least one of said systems being engaged on a walker.

Another feature of the present invention is the provision in a guided movement platform, of the guided movement platform being engaged on a housing that is portable and carriable by the pedestrian user.

An advantage of the present invention is that guided movement is provided for the visually impaired, dementia patients and the elderly.

Another advantage of the present invention is that guided movement is provided inexpensively for the visually impaired, dementia patients and the elderly.

FIG. 1 show a diagrammatic view of the present guided movement platform. The guided movement platform is indicated by reference numeral 10. Guided movement platform 10 includes a user interface system 12, a cell phone system 14, a radar system 16, a wireless control and communication system 18 or Bluetooth system 18, a radio frequency identification system 20, a mote system 22, and a global positioning system 24.

The User Interface System 12

Figure 2:
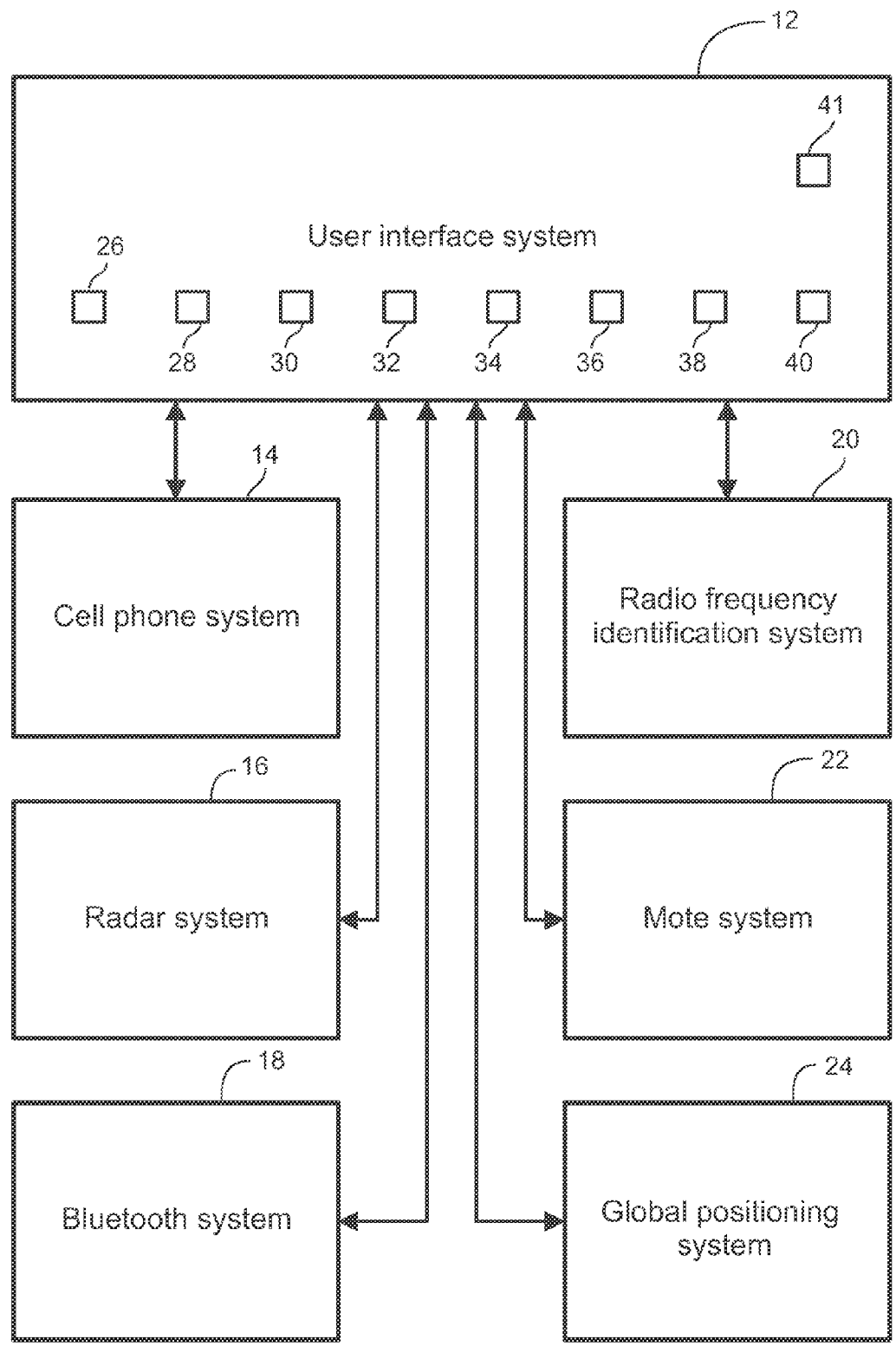
FIG. 2 is a diagrammatic view of the user interface system of the guided movement platform of FIG. 1 being in communication with each of the other systems of the guided movement platform of FIG. 1.

FIG. 2 shows a diagrammatic view of the user interface system 12 of the guided movement platform 10 of FIG. 1 being in communication, such as one way or two way communication, with each of the other systems 14, 16, 18, 20, 22 and 24 of the guided movement platform 10 of FIG. 1. Such communication may be hard wired or wireless.

The user interface system 12 may include the cell phone system 14. Alternatively, the user interface system 12 may be part of the cell phone system 14 such that the cell phone system 14 includes the user interface system 12.

The user interface system 12 is an interface between the pedestrian user and the other systems 14, 16, 18, 20, 22 and 24. The pedestrian user interacts with the user interface system 12 by at least one of speech, hearing, touch, and sight. The user interface system 12 may include a microphone 26 and voice recognition software 28 such that the pedestrian user interacts with the user interface system 12 by speech. The user interface system 12 may include a keyboard 30, keypad 32 such as found on a cell phone, and/or touchscreen 34 such that the pedestrian user interacts with the user interface system 12 by touch. The user interface system 12 may include speakers 36 such that the pedestrian user interacts with the user interface system 12 by hearing. The user interface system 12 may include an electronic display 38 such that the pedestrian user interacts with the user interface system 12 by sight. The user interface system 12 may include a power source 40 or share power from a power source primarily dedicated to one or more of the other systems 14, 16, 18, 20, 22 and 24. The user interface system 12 may include a computer, processor, or microprocessor 41 or share such with one or more of the other systems 14, 16, 18, 20, 22 and 24.

As to the user interface system 12 and guided movement platform 10, the Shim et al. U.S. Pat. No. 6,640,113 B1 issued Oct. 28, 2003 and entitled Touch Sensitive Display Integrated With A Handheld Radiotelephone is hereby incorporated by reference in its entirety.

As to the user interface system 12 and guided movement platform 10, the Garrett et al. U.S. Pat. No. 8,036,600 B2 issued Oct. 11, 2011 and entitled Using A Bluetooth Capable Mobile Phone To Access A Remote Network is hereby incorporated by reference in its entirety.

As to the user interface system 12 and guided movement platform 10, the Eberhard U.S. Pat. No. 8,068,873 issued Nov. 29, 2011 and entitled Cellular Telephone Without Integrated Speaker And Microphone is hereby incorporated by reference in its entirety.

As to the user interface system 12 and guided movement platform 10, the Karaoguz et al. U.S. Pat. No. 7,480,514 B2 issued Jan. 20, 2009 and entitled GPS Enabled Cell Phone With Compass Mode Mapping Function is hereby incorporated by reference in its entirety.

The Cell Phone System 14

Figure 3:
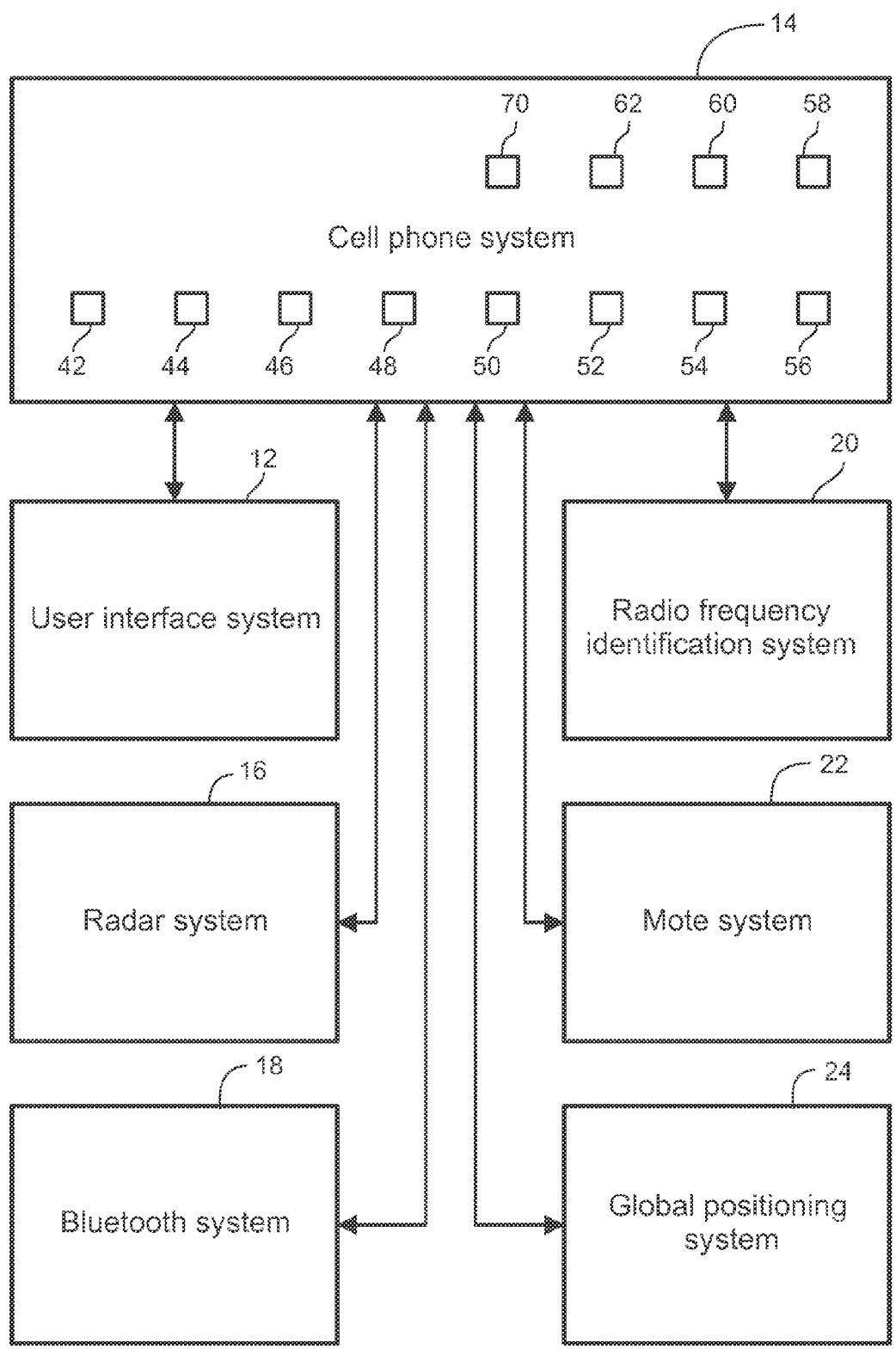
FIG. 3 is a diagrammatic view of the cell phone system of the guided movement platform of FIG. 1 being in communication with each of the other systems of the guided movement platform of FIG. 1.

FIG. 3 shows a diagrammatic view of the cell phone system 14 of the guided movement platform 10 of FIG. 1 being in communication, such as one way or two way communication, with each of the other systems 12, 16, 18, 20, 22, and 24 of the guided movement platform 10 of FIG. 1. Such communication may be hard wired or wireless.

The cell phone system 14 may include the user interface system 12. Alternatively, the cell phone system 14 may be part of the user interface system 12 such that the user interface system 12 includes the cell phone system 14.

The cell phone system 14 may, if desired, be an interface between the pedestrian user and the other systems 12, 16, 18, 20, 22 and 24. The pedestrian user may interact with the cell phone system 14 by at least one of speech, hearing, touch, and sight. The cell phone system 14 may include a microphone 42 and voice recognition software 44 such that the pedestrian user interacts with the cell phone system 14 by speech. The cell phone system 14 may include a keyboard 46, keypad 48 such as found on a cell phone, and/or touchscreen 50 such that the pedestrian user interacts with the cell phone system 14 by touch. The cell phone system 14 may include speakers 52 such that the pedestrian user interacts with the cell phone system 14 by hearing. The cell phone system 14 may include an electronic display 54 such that the pedestrian user interacts with the cell phone system 14 by sight. The cell phone system 14 may include a power source 56 or share power from a power source primarily dedicated to one or more of the other systems 12, 16, 18, 20, 22 and 24. The cell phone system 14 may include a computer, processor, or microprocessor 58 or share such with one or more of the other systems 12, 16, 18, 20, 22 and 24.

The cell phone system 14 can include cell phone software that can be uploaded to individual phones and address some of the concerns that the blind and partially sighted have such as 1) to convert sensed data into verbal communication, 2) to speak to pedestrian users in several different languages, 3) to allow pedestrian users to listen to voice mails and even write and send e-mails. Emails may be prepared by voice (employing voice recognition software 44) or by touch (employing keypads 48, touchscreens 50 or keyboards 46).

The cell phone system 14 includes cell phones 60 that are connected to a server that allows for continuous update to most recent maps.

The cell phone system 14 can include GPS-compatible cell phones 60 and personal digital assistant devices 62 (PDA's) that provide verbal instructions.

The cell phone system 14 can include or have access to GPS (global positioning system) technology, such as through communication with the global positioning system 24. The cell phone system 14 can include or have access to personal navigation personal assistant devices having navigational software.

The cell system 14 can include or have access to GPS steering 70, which includes GPS steering software, such as through the global positioning system 24. GPS steering 70 automatically guides the visually impaired through voiced instructions, or displayed instructions, or by automatically controlling one or more wheels of the intelligent walking stick 64, wheelchair 66, or walker 68. These wheels of the intelligent walking stick 64, wheelchair 66 and walker may pull a pedestrian user forwardly, push a pedestrian user rearwardly, pull a pedestrian user to the right, pull a pedestrian user to the left, steer a pedestrian user, stop a pedestrian user, or begin rotation so as to begin to pull or push a pedestrian user.

GPS steering 70 enhances visibility when snow, rain, or fog obscures the actual view. If the visually impaired strays from the guided path, GPS steering 70 gently guides the individual back to the on-course path.

The GPS compatible cell phone 60 is the single most valuable piece of technology for the blind.

GPS steering 70 includes the employment of the radar system 16. The radar system 16 substitutes for or complements natural sight. The radar system 16 may be used regardless of the vision capabilities of the pedestrian user, i.e., whether the pedestrian user has extra-ordinary sight, normal sight, impaired sight, or has no sight.

The cell phone system 14 can include Java software. Java runs on nearly every modern cell phone.

In some embodiments, one of the user interface system 12 and cell phone system 14 may be not be incorporated into the guided movement platform 10 since one of the systems 12, 14 may be superfluous.

As to the cell phone system 14 and guided movement platform 10, the Shim et al. U.S. Pat. No. 6,640,113 B1 issued Oct. 28, 2003 and entitled Touch Sensitive Display Integrated With A Handheld Radiotelephone is hereby incorporated by reference in its entirety.

As to the cell phone system 14 and guided movement platform 10, the Garrett et al. U.S. Pat. No. 8,036,600 B2 issued Oct. 11, 2011 and entitled Using A Bluetooth Capable Mobile Phone To Access A Remote Network is hereby incorporated by reference in its entirety.

As to the cell phone system 14 and guided movement platform 10, the Schuchman et al. U.S. Pat. No. 5,726,893 issued Mar. 10, 1998 and entitled Cellular Telephone With Voice-In-Data Modem is hereby incorporated by reference in its entirety.

As to the cell phone system 14 and guided movement platform 10, the Eberhard U.S. Pat. No. 8,068,873 issued Nov. 29, 2011 and entitled Cellular Telephone Without Integrated Speaker And Microphone is hereby incorporated by reference in its entirety.

As to cell phone system 14 and guided movement platform 10, the Karaoguz et al. U.S. Pat. No. 7,480,514 B2 issued Jan. 20, 2009 and entitled GPS Enabled Cell Phone With Compass Mode Mapping Function is hereby incorporated by reference in its entirety.

The Radar System 16

Figure 4:
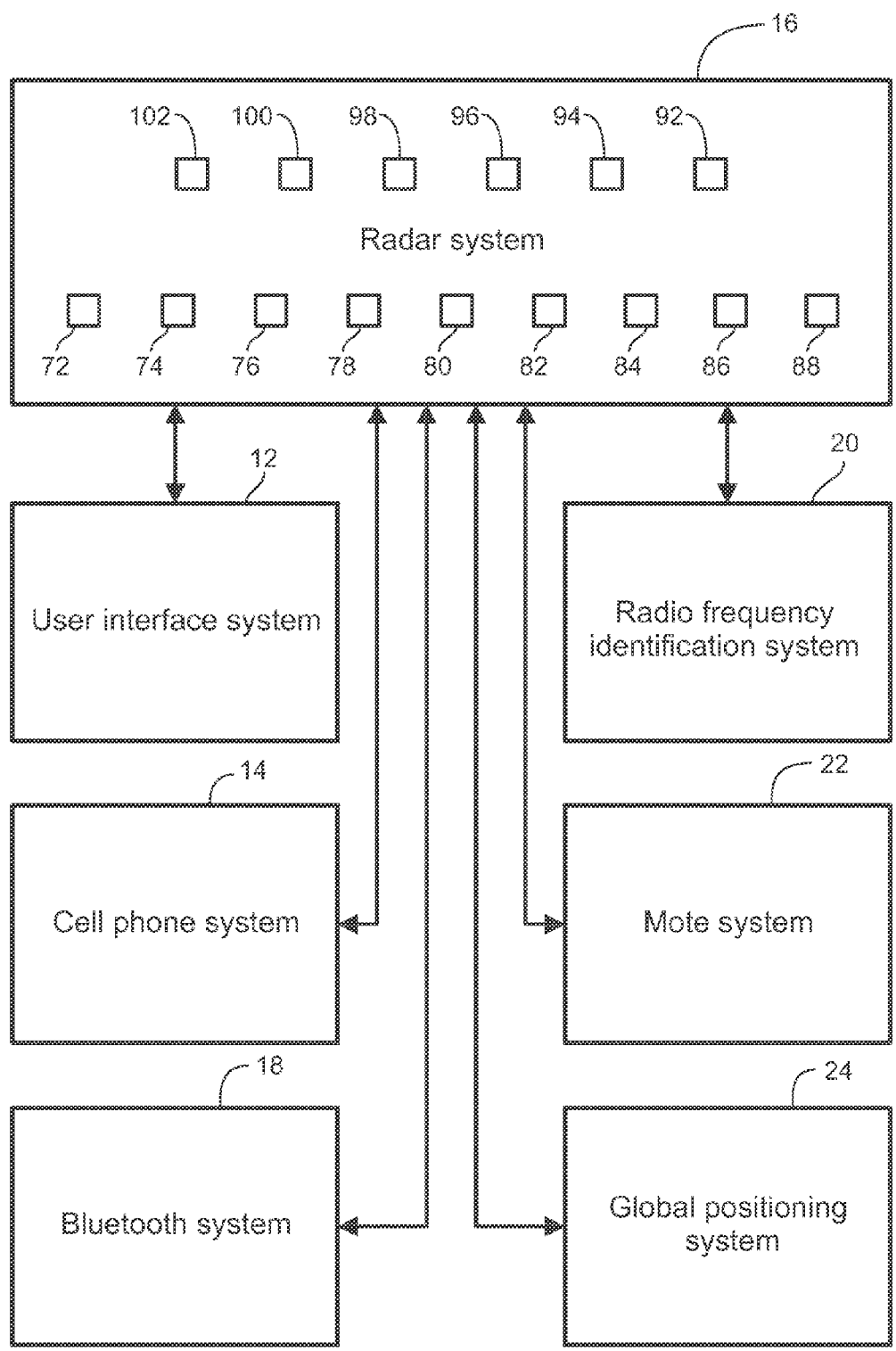
FIG. 4 is a diagrammatic view of the radar system of the guided movement platform of FIG. 1 being in communication with each of the other systems of the guided movement platform of FIG. 1.

FIG. 4 shows a diagrammatic view of the radar system 16 of the guided movement platform 10 of FIG. 1 being in communication, such as one way or two way communication, with each of the other systems 12, 14, 18, 20, 22 and 24 of the guided movement platform 10 of FIG. 1. Such communication may be hard wired or wireless.

The radar system 16 receives radar sensed data and deploys a corresponding response. The radar system 16 detects objects in real time. That is, the radar system detects objects that are presently in the environment of the pedestrian user. Such real time objects may or may not have been present in the environment the previous time the pedestrian user moved through the particular environment. If the objects were present at a prior time, the radar system 16 may store such data as a predetermined standard.

The radar system 14 includes radar and sensor-based systems that work in combination with and include: microwave radar 72, millimeter wave radar 74, laser radar 76, ultrasound 78, video image processing 80, infrared imaging 82, infrared illumination 84, ultraviolet illumination 86 and other types of radar, imaging and illumination. The radar system 14 transmits electromagnetic energy that detects energy reflected by objects and converts invisible images into visible images.

The radar system 16 includes a computer or processor 88. In radar and sensor-based systems, the processor 88 is designed and programmed to receive real-time data (analog or digital) from transducers, sensors, and other data sources that monitor a physical process. The processor 88 can also generate signals to elements that control a process. That is, a processor receives sensed data from a sensor, compares the data with a predetermined standard, and then generates a signal that: a) transmits images to other enabled devices; transmits information to other enabled devices, b) selects an optional path, c) preempts a set of traffic lights, d) initiates a counter-thrust to assist in maintaining balance; and/or e) accomplishes another function or deploys another action.

Automated contact from more than one search radar with common fields of view and cell phone technology convert and combine sensed and imaged scenes into integrated, dynamic, visible and audible displays.

The radar system 16 includes the laser radar 76. Laser radar 76 flags hazards and obstacles, forming images by scanning the environment in both the azimuth and elevation directions, and assists in navigating curbs, inclines and declines, dips and rises, low hanging hazards, and other features of the environment.

The radar system 16 includes computer vision algorithms 92 that analyze camera images and extract information that can be used for various tasks such as recognizing objects and detecting motion.

The radar system 16 includes intelligent video 94 that performs video analysis and automated video monitoring. Intelligent video 94 identifies objects, analyzes motion and extracts video intelligence—issuing real-time alerts when exceptions occur.

The radar system 16 includes video and digital image processing systems 96 that recognize traffic signals and advise when it is safe for an impaired person (child, senior, anyone who carries or wears on-person sensors, including sensors and processors built into clothing and footwear) to cross.

The radar system 16 may include sensors 98 for temperature, light, sound, position, acceleration, vibration, stress, weight, pressure, humidity, global position (i.e., the sensor may include a GPS), magnetic or magnetic fields, and other measurable features of the environment.

The radar system 16 may include ultrasound imaging 78 (sonography) that uses high frequency sound waves instead of ionizing radiation. When the sound waves strike specific surfaces, echoes are produced. The echoes are detected by a transducer and are then electronically converted into an anatomic image that is displayed on a video screen. The image can be recorded on film or video tape, and can be done in a real-time format. Sonography can be used for the detection, identification, and location of a visually impaired individual or lost dementia patient.

The radar system 16 may include continuous wave radar 100. An advantage of continuous wave radar 100 is its extreme precision and its ability to warn when danger is imminent. Continuous wave radar 100 can anticipate a hazard several feet ahead and trigger direction changes while still targeting the requested destination, to deliver near hazard-free guidance.

The radar system 16 may include a tracking system 102 that includes a transmitter and transponder. Upon receiving a designated signal, the tracking system 102 emits a radio signal of its own that is used for the detection, identification, and location of visually impaired patients and/or dementia patients. The guided movement platform 12, by employing the GPS system 24, radar system 16, cell phone system 14, and/or user interface system 12 may a) provide verbal and guided directions to desired destinations, and b) detect, identify, and locate visually impaired patients and/or dementia patients.

The radar system 16 and global positioning system 24 may work together. For example, sensed data received from a transponder, which is an integrated receiver and transmitter of radio signals, is transmitted to a transducer which electronically converts the radio signal into electromagnetic energy. A processor compares the data received with a predetermined standard and deploys an action to, for example, a) select an optional path, circumventing a detected hazard, and/or preempt a set of traffic lights when danger is imminent, and/or deploy another action.

As to the radar system 16 and guided movement platform 10, the Breed U.S. Pat. No. 7,983,802 B2 issued Jul. 19, 2011 and entitled Vehicular Environment Scanning Techniques is hereby incorporated by reference in its entirety.

As to the radar system 16 and guided movement platform 10, the Edwards et al. U.S. Pat. No. 8,423,280 B2 issued Apr. 16, 2013 and entitled Vehicle Collision Avoidance System is hereby incorporated by reference in its entirety.

As to the radar system 16 and guided movement platform 10, the Lemelson et al. U.S. Pat. No. 6,275,773 B1 issued Aug. 14, 2001 and entitled GPS Vehicle Collision Avoidance Warning And Control System And Method is hereby incorporated by reference in its entirety.

The Bluetooth System 18

Figure 5:
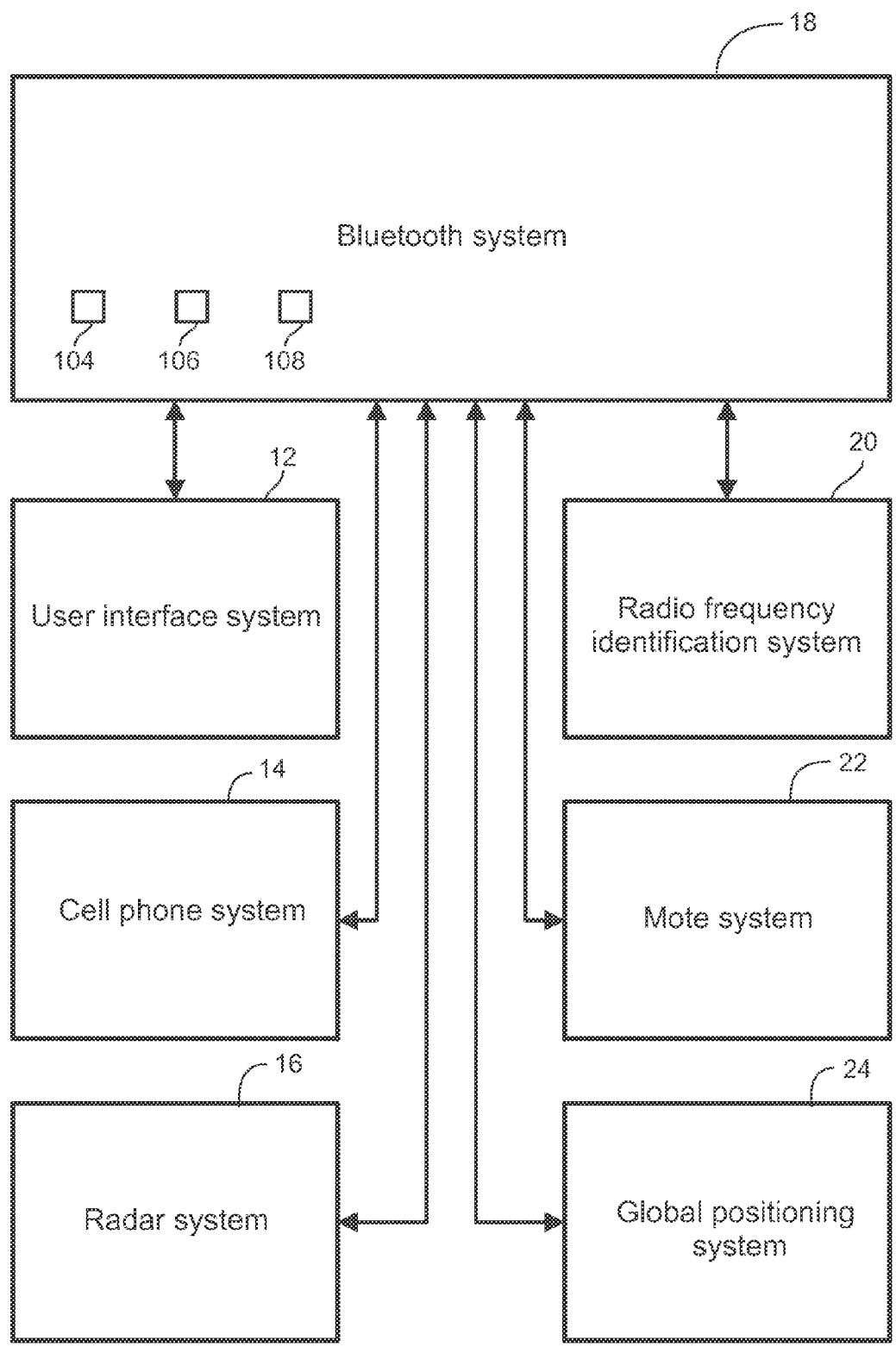
FIG. 5 is a diagrammatic view of the wireless control and communication system or Bluetooth system of the guided movement platform of FIG. 1 being in communication with each of the other systems of the guided movement platform of FIG. 1.

FIG. 5 shows a diagrammatic view of the wireless control and communication system 18 or Bluetooth system 18 of the guided movement platform 10 of FIG. 1 being in wireless communication with each of the other systems 12, 14, 16, 20, 22, and 24 of the guided movement platform 10 of FIG. 1. The Bluetooth system 18 is a core system that consists of a radio frequency transceiver 104, baseband 106, and protocol stack 108. The Bluetooth system 18 offers services that enable the connection of devices or interconnection of systems 12, 14, 16, 20, 22 and 24 and the exchange of a variety of classes of data between these devices or systems 12, 14, 16, 20, 22 and 24. Many features of the core system or core specification are optional, allowing product differentiation. Bluetooth profiles are definitions of possible applications and specify general behaviors that Bluetooth enabled devices use to communicate with other Bluetooth devices or systems. Each of the systems 12, 14, 16, 20, 22 and 24 may include a device that is Bluetooth enabled. For example, the cell phone 60 of the cell phone system 14 may be Bluetooth enabled. Further, sensors 98 of the radar system 16 may be Bluetooth enabled. Or continuous wave radar 100 of the radar system 16 may be Bluetooth enabled. All devices present in each of the systems 12, 14, 16, 20, 22 and 24 are preferably Bluetooth enabled and can communicate with each other through the Bluetooth system 18.

The present Bluetooth system 18 uses Bluetooth where a) Bluetooth is a wireless technology or wireless technology standard for exchanging data over short distances from fixed and mobile devices, b) where Bluetooth is a wireless technology or wireless technology standard for building personal area networks, c) where Bluetooth employs short wavelength UHF radio waves in the ISM band from 2.4 to 2.485 GHz, d) where Bluetooth technology may connect two or more devices with minimal or no problems of synchronization, e) where Bluetooth employs a frequency hopping spread spectrum radio technology, f) where Bluetooth transmits data that are divided into packets, g) where each of the packets is transmitted on one of 79 designated Bluetooth channels, and h) where Bluetooth is a packet based protocol with a master-slave structure.

A Bluetooth system is but one example of a wireless control and communication system for the wireless control and communication system 18.

As to the Bluetooth system 18 and guided movement platform 10, and as to devices, systems and/or methods of Bluetooth communication for Bluetooth system 18, the Preiszler et al. U.S. Patent Application Publication Number US 2013/0273851 A1 published Oct. 17, 2013 and entitled Device, System and Method Of Bluetooth Communication is hereby incorporated by reference in its entirety.

The Radio Frequency Identification System 20

Figure 6:
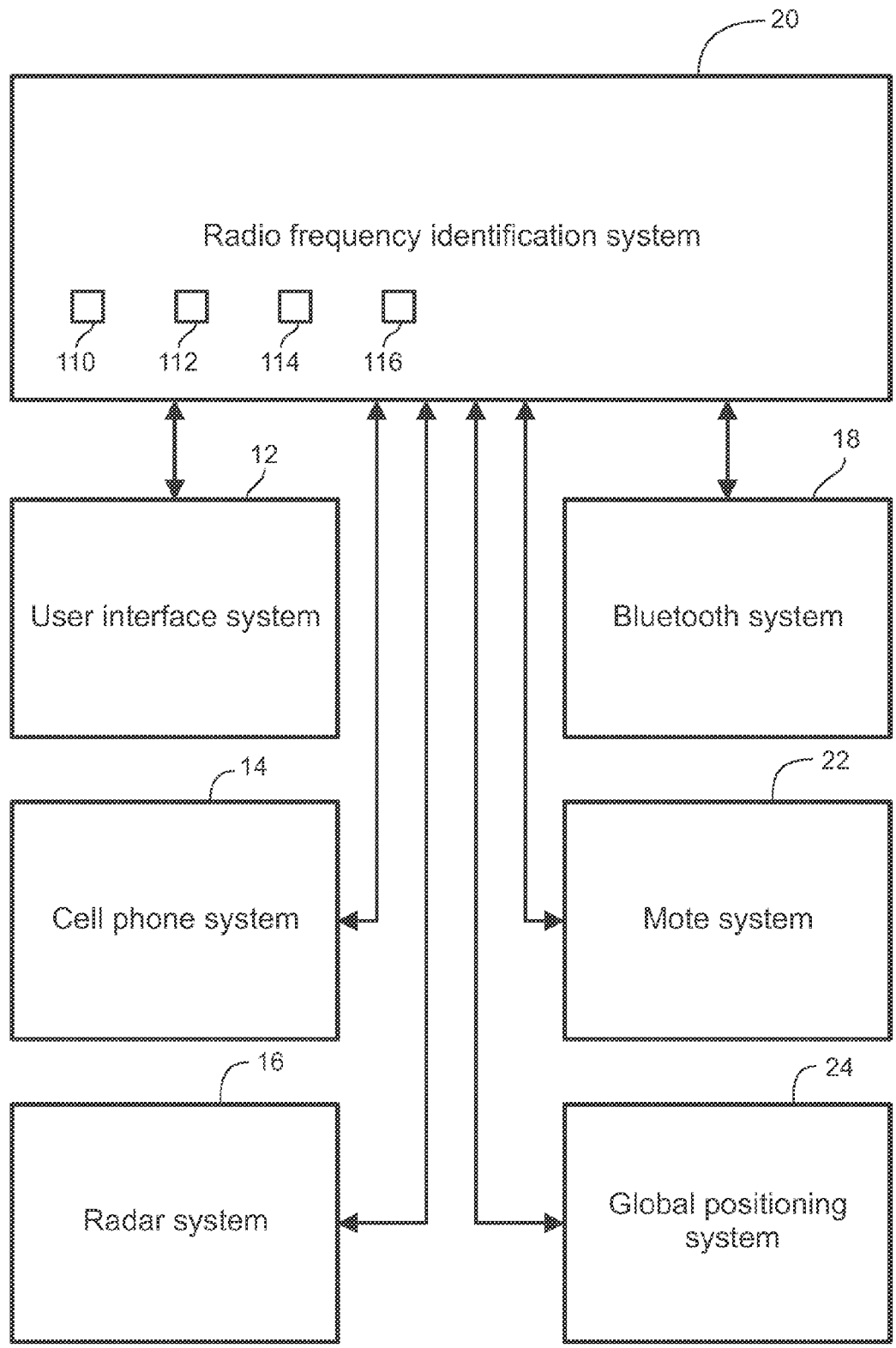
FIG. 6 is a diagrammatic view of the radio frequency identification system of the guided movement platform of FIG. 1 being in communication with each of the other systems of the guided movement platform of FIG. 1.

FIG. 6 shows a diagrammatic view of the radio frequency identification system 20 of the guided movement platform 10 of FIG. 1 being in communication, such as one way or two way communication, with each of the other systems 12, 14, 16, 18, 22 and 24 of the guided movement platform 10 of FIG. 1. Such communication may be hard wired or wireless.

The radio frequency identification system 20 or RFID system 20 includes a microchip 110, an antenna 112, a reader 114, and a tag 116, where the reader 114 sends out electromagnetic waves which are received by the antenna 112 and converted to digital data by the microchip 110.

The reader 114 includes a transceiver. The transceiver generates a weak radio signal that may have a range from a few feet to a few yards. The signal is necessary to awaken the RFID tag 116 and is transmitted through the antenna 112. The signal itself is a form of energy that can be used to power the tag 116. This whole process can take as little as a few milliseconds.

RFID tags 116 can be positioned in public locations so as to identify meat sections, candy aisles, and vegetable stands at grocery stores, teller booths, auto ticket machines, stairs, train platforms, public restrooms, stalls in public restrooms, as well as millions of other public and private locations.

An RFID tag 116 can be as small as a grain of black pepper and be embedded right into a product's packaging, or into the product itself.

The transponder is the part of the RFID tag 116 that converts that radio frequency into usable power, as well as being the part of the RFID tag 116 that sends and receives messages.

The RFID system 20 can process and communicate the information gathered by the reader 114 from the tag 116 to the user interface system 12 or to the cell phone system 14. One of the user interface system 12 or cell phone system 14 then can process such information and/or communicate such information to the pedestrian user directly. Such communication can take place through the Bluetooth system 18.

As to the RFID system 20 and guided movement platform 10, the Archer et al. U.S. Pat. No. 8,552,839 B2 issued Oct. 8, 2013 and entitled Method And Apparatus For Managing Radio Frequency Identification (RFID) Tags is hereby incorporated by reference in its entirety.

The Mote System 22

Figure 7:
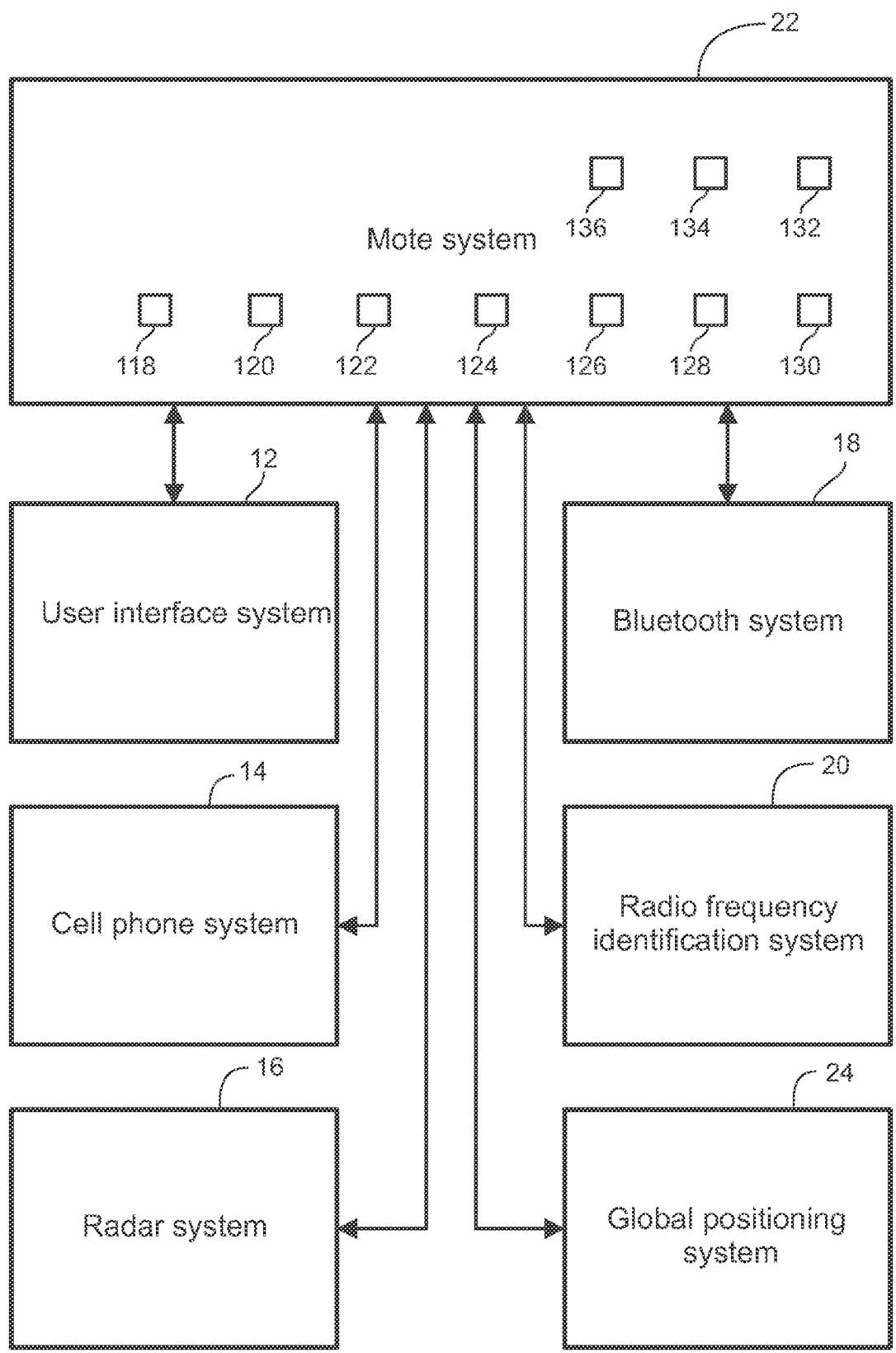
FIG. 7 is a diagrammatic view of the mote system of the guided movement platform of FIG. 1 being in communication with each of the other systems of the guided movement platform of FIG. 1.

FIG. 7 shows a diagrammatic view of the mote system 22 of the guided movement platform 10 of FIG. 1 being in communication, such as one way or two way communication, with each of the other systems 12, 14, 16, 18, 20 and 24 of the guided movement platform 10 of FIG. 1. Such communication may be hard wired or wireless.

The mote system 22 includes wireless sensor network motes 118 that consist of spatially distributed autonomous devices. Motes 118 may be present in one or more of the other systems 12, 14, 16, 18, 20 and 24. Systems or portions of systems 12, 14, 16, 18, 20 and 24 may be present in one or more motes 118.

The idea and purpose behind mote 118 is to combine communication, computation, and sensing into tiny single packages. In a first embodiment, a single chip of a wireless mote 118 includes some or all of the following components: memory 120 (to store data), and A/D converter 122 (to digitize and read sensed data), a computer or microprocessor or microcontroller 124 (to connect a mote 118 with a radio link), a radio transmitter 126, one or more GPS sensors 128, a battery or power source 130, and antenna 132. In mass production, it is estimated the cost of a chip of a wireless mote 118 will be less than one dollar.

The mote system 22, user interface system 12, cell phone system 16, Bluetooth system 18, radio frequency identification system 20, global positioning system 24, and wireless sensor network motes 118, work in combination a) to monitor physical and environmental conditions, b) to detect, identify, locate, and display sensed and imaged scenes, and c) to convert information into verbal communication.

Figure 10A:
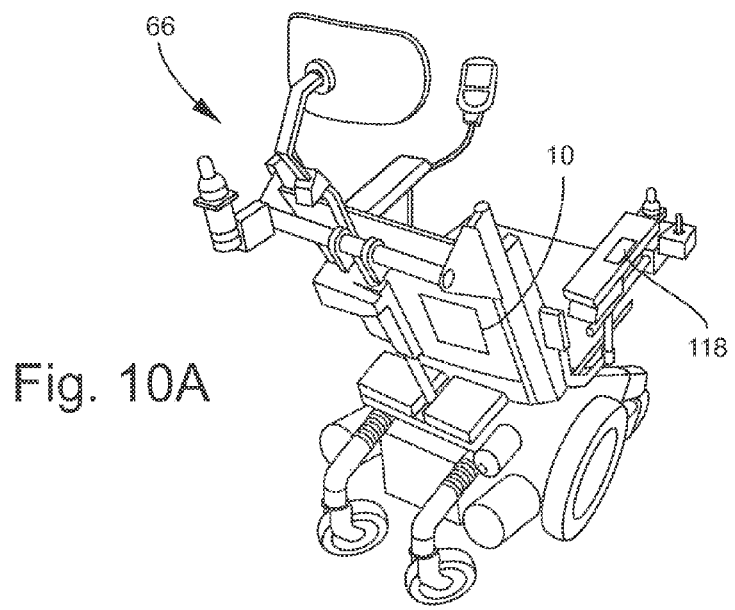
FIG. 10A is a perspective view of a wheelchair having the guided movement platform of FIG. 1.
Figure 10B:
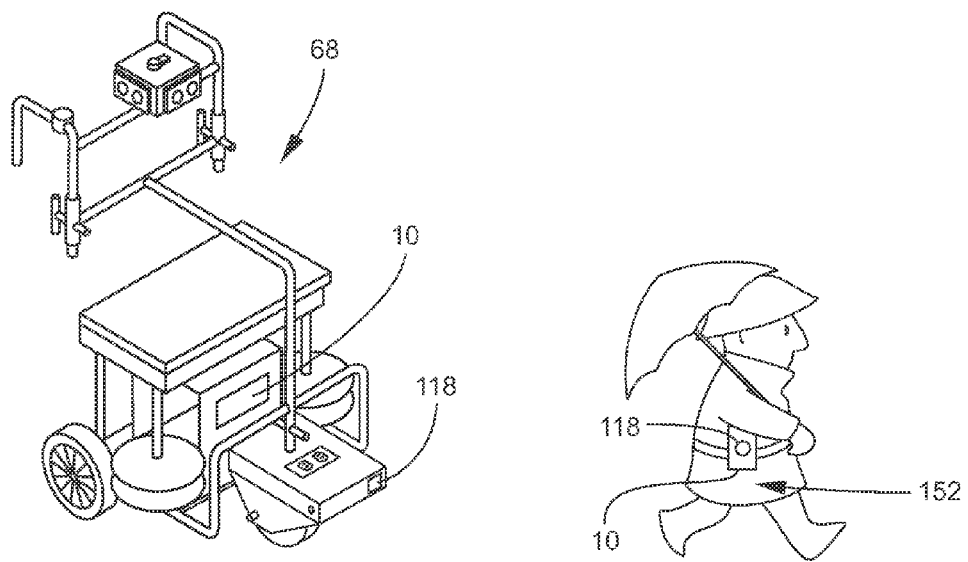
FIG. 10B is a diagrammatic view of a walker having the guided movement platform of FIG. 1.
Figure 10C:
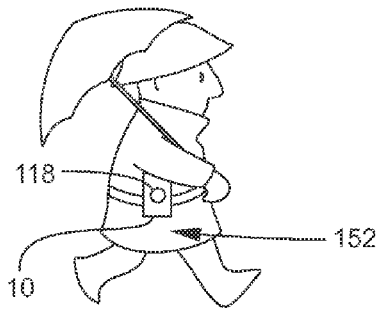
FIG. 10C is a diagrammatic view of a pedestrian user carrying the guided movement platform of FIG. 1 in a portable form as an on-person sensor apparatus.
Figure 11A:
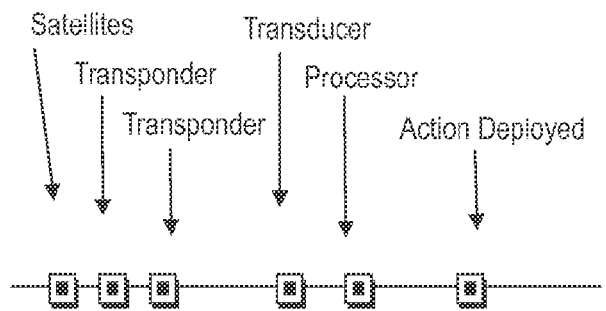
FIG. 11A is a diagrammatic view of how sensed data is received and corresponding response is deployed with regard to wireless sensor network motes plus GPS of the guided movement platform of FIG. 1.
Figure 11B:
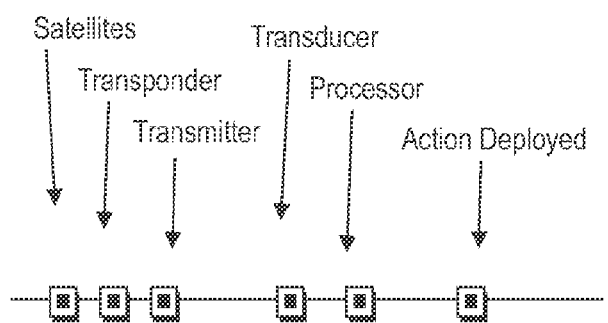
FIG. 11B is a diagrammatic view of how sensed data is received and corresponding response is deployed with regard to radar and sensor-based systems plus GPS of the guided movement platform of FIG. 1.

In a second embodiment, each sensor node or mote 118 may include at least a microcontroller 124, transceiver 134, memory 120, power source 130 and one or more sensors 136, where the sensor or sensors 136 are either internal or external to the intelligent walking stick 64, intelligent wheelchair 66, intelligent walker 68, and on-person housing or sensor apparatus 152 having the guided movement platform 10 as shown in FIG. 10C.

The motes 118 function within a network and typically fulfill one of two purposes: either a) data-logging, processing, and/or transmitting sensor information from the environment, or b) acting as a gateway in an adhoc wireless network formed by all the sensors 136 to pass data back to a (usually unique) collection point. The collection point may be the guided movement platform 10 found on the intelligent walking stick 64, intelligent wheelchair 66, intelligent walker 68, or on-person housing or sensor apparatus 152 having the guided movement platform 10 as shown in FIG. 10C.

Using the mote system 22, automatic processing of data is used to reduce complexity and to fuse information from multiple sensors. Increased reliability can be achieved by accepting and attaching other platforms. Redundant transmissions may require more available plug-ins.

The mote system 22 and global positioning system 24 may work together. For example, the wireless sensor network motes 118 combine communication, computation and sensing into tiny packages. The sensed data received, which is "visible" to all enabled motes 118, transmits a radio signal to a transducer which electronically converts the radio signal into electromagnetic energy. A processor in the guided movement platform 10 compares the data received with a predetermined standard and deploys an action to, for example, a) select an optional path, circumventing a detected hazard, and/or b) preempt a set of traffic lights when danger is imminent, and/or c) deploy another action.

The present mote system 22 including a mote 118 or network of motes 118 can 1) obtain timely information and 2) reliably communicate the information to a monitoring station found, for example, in the guided movement platform 10.

The mote system 22 may include one or more wireless sensor networks that utilize "smart dust" sensors 118 or "motes" 118 that detect changes in the environment and transmit data to a monitoring station in the guided movement platform 10.

In a third embodiment, each of the motes 118 includes a) a power source 130 such as a solar cell, b) a network node such as a remote transceiver 134, and miniature devices such as sensors 136 that are capable of measuring environmental changes such as spikes in temperatures and the presence of dangerous chemical agents.

The mote system 22 may include mote networks having 1) a plurality of motes for sensing environmental changes and communicating data, and 2) a virtual network that provides a communication infrastructure for routing data amongst the plurality of motes through a mesh or ad hoc network.

The mote system 12 may include motes 118 where each mote 118 is a self contained unit capable of communicating wirelessly to neighboring motes 118. If a mote 118 loses the ability to relay data, the data can be re-routed using other available motes 118. Information from the mote network may be relayed to transport routers, such as radio transmitters 126, that in turn relay the data to a monitoring station that may, for example, be found in the guided movement platform 10. A router may be a radio transmitter 126 or another relay device. A monitoring station may be the guided movement platform 10 where the sensed data from the mote network can be analyzed, stored and displayed, such as through the cell phone 60 that includes a processor and display.

A pedestrian user of the present invention may be employing, as an aid, the intelligent walking stick 64, the intelligent wheelchair 66, the intelligent walker 68, or may have the guided movement platform 10 in a housing of on-person sensor apparatus 152 on his or her belt as shown in FIG. 10C.

This pedestrian user may encounter an environment having a plurality of motes 118. These motes 118 may have anyone of a number of sensors 136 such as for water, ice, snow, fire, smoke, light, wind, movement, movement by the earth such as when a car is approaching, movement by a person walking, the light of approaching headlights of a car, a red light, a green light, a yellow light, an orange light. These motes 118 may then communicate the information on such conditions to a radio transmitter that in turn communicate such information to the guided movement platform 10 that may be on the intelligent walking stick 64, the intelligent wheelchair 66, or the intelligent walker 66, or carried as an on-person sensor apparatus 152 by the pedestrian user as shown in FIG. 10C. The pedestrian user then, through the cell phone system 14 or the user interface system 12, then makes use of such information.

Instead of or along with motes 118 in the environment, motes 118 may be engaged to 1) the intelligent walking stick 64, 2) the intelligent wheelchair 66, 3) the intelligent walker 68, or 4) the housing of the on-person sensor apparatus 152 having the guided movement platform 10 that is carried by the person as shown in FIG. 10C and may be referred to herein as housing motes 118. Housing motes 118 may be engaged internally, within the housing of the guided movement platform 10, or externally on the housing of the guided movement platform 10, whether or not the guided movement platform 10 is carried by a person on a belt as an on-person sensor apparatus 152 as shown in FIG. 10C or engaged to one of the intelligent walking stick 64, intelligent wheelchair 66, or intelligent walker 68.

These housing motes 118 may have anyone of a number of sensors such as for water, ice, snow, fire, smoke, light, wind, movement, movement by the earth such as when a car is approaching, movement by a person walking, the light of approaching headlights of a car, a red light, a green light, a yellow light, an orange light. These housing motes 118 may then communicate the information on such conditions to a radio transmitter or other router that may be part of or separate from the guided movement platform 10. The routers then communication such information to a monitoring station of the guided movement platform 10, where a monitoring station may be, for example, the computing unit and/or display of the cell phone system 14 or the storage component of the global positioning system 24 or the storage component of the radar system 16 of the guided movement platform 10, which may be engaged on the intelligent walking stick 64, the intelligent wheelchair 66, or the intelligent walker 66, or carried by the pedestrian user as shown in FIG. 10C in an on-person sensor apparatus 152. The pedestrian user, through the cell phone system 14 or the user interface system 12, then makes use of such information such as by looking at the information displayed on the cell phone system 14 or user interface system 12 or listening to such information through the cell phone system 14 or user interface system 12. A housing mote 118 having an exaggerated size is shown engaged to the distal end of the intelligent walking stick 64 in FIG. 9. The housing mote 118 may be engaged in or on the housing of the guided movement platform 10, as shown in FIG. 10C with the on-person sensor apparatus 152, or on a portion of the intelligent wheelchair 10A or on a portion of the intelligent walker 10B.

In a fourth embodiment, mote 118 may be composed of sensors, actuators, computational entities, and/or communications entities formulated, in most cases at least in part, from a substrate. Mote 118 may be a semi-autonomous computing, communication, and/or sensing device. Mote 118 may include an antenna, physical layer, antenna entity, network layer, light device entity, electrical/magnetic device entity, pressure device entity, temperature device entity, volume device entity, and inertial device entity. The light device entity, electrical/magnetic device entity, pressure device entity, temperature device entity, volume device entity, antenna entity, and inertial device entity may respectively couple through physical layers with light device, electrical/magnetic device, pressure device, temperature device, volume device, antenna, and inertial device.

Mote 118 may be of various sizes, and may be as small as a quarter coin, or smaller, as mote sizes are now in the millimeter range.

In a fifth embodiment, mote 118 may include a power source, a logic circuit/microprocessor, a storage device, a transmitter (or transceiver), a communications coupler coupled to the transmitter, and a mote element or sensing element.

In a sixth embodiment, mote 118 may be unpowered or passive, drawing its power from a reader or another source.

The power source of the mote 118 provides power to the mote. For example, the power source may include a battery, a solar-powered cell, and/or a continuous power supply furnished by an external power source, such as by connection to a power line.

The storage device of the mote 118 may include any computer readable media, such as volatile and/or nonvolatile media, removable and/or non-removable media, for storing computer data in permanent or semi-permanent form, and can be implemented with any data storage technology.

The storage device of the mote 118 may store data in a form that can be sampled or otherwise converted into a form storable in a computer readable media.

The transmitter of the mote 118 transmits a data signal. The transmitter may both receive and transmit data signals (function as a transceiver). A "data signal" includes, for example and without limitation, a current signal, voltage signal, magnetic signal, or optical signal in a format capable of being stored, transferred, combined, compared, or otherwise manipulated.

The transmitter of the mote 118 may include wireless, wired, infrared, optical, and/or other communications techniques, for communication with a central computing device or central station such as may be found in the guided movement platform 10, and optionally with other motes, using the communications coupler. The communications coupler may include an antenna for wireless communication, a connection for wired connection, and/or an optical port for optical communication.

The mote 118 may include any type of data processing capacity, such a hardware logic circuit, for example an application specific integrated circuit (ASIC) and a programmable logic, or such as a computing device, for example, a microcomputer or microcontroller that include a programmable microprocessor. Mote 118 may include data-processing capacity provided by a microprocessor. The microprocessor may include memory, processing, interface resources, controllers, and counters. The microprocessor also generally includes one or more programs stored in memory to operate the mote 118. If an embodiment uses a hardware logic circuit, the logic circuit generally includes a logical structure that operates the mote 118.

The mote 118 may include one or more mote elements or sensor elements 136 that are capable of detecting a parameter of an environment in which the mote 118 is located and outputting a data signal. The mote element or sensing element 136 may detect at least one parameter from a group of optical, acoustic, pressure, temperature, thermal, acceleration, magnetic, biological, chemical, and motion parameters. The optical parameter may include at least one from a group consisting of infrared, visible, and ultraviolet light parameters. For example and without limitation, the mote element or sensing element 136 may include a photo sensor to detect a level or change in level of light, a temperature sensor to detect temperature, an audio sensor to detect sound, and/or a motion sensor to detect movement. The mote element or sensing element 136 may include a digital image capture device, such as for example and without limitation, a CCD or CMOS imager that captures data related to infrared, visible, and/or ultraviolet light images.

The mote 118 automatically acquires data related to a parameter of the mote environment, and transmits data to a central computing device found in the guided movement platform 12. For example, the mote element or sensing element 136 in a form of an acoustic sensor may acquire sound levels and frequencies, and transmit the data related to the levels and frequencies along with a time track using the transmitter and the communication coupler. The acquisition may be on any basis, such as continuously, intermittently, sporadically, occasionally, and upon request. In an alternative embodiment, the time track may be provided elsewhere, such as a device that receives the sensor data.

By way of further example and without limitation, the mote element or sensing element 136 in a form of an optical digital camera may periodically acquire visual images, such as for example, once each second, and to transmit the data related to visual images along with a time track. In another example, the mote element or sensing element in the form of a temperature sensor may detect temperature changes in two-degree temperature intervals, and to transmit each two-degree temperature change along with the time it occurred. Each of the above examples illustrates a sequence, ranging from continuous for acoustical detection to a per occurrence basis for two-degree temperature changes.

The mote element or sensing element 136 of the mote 118 may sense operational parameters of the mote 118 itself, such as its battery/power level, or its radio signal strength. Mote data, including a data related to a sensed parameter, is transmitted from the mote 118 in any signal form via the transmitter and the communications coupler, to a receiver. The receiver may be, for example, another mote 118, a central computing device found in one of the systems 12, 14, 16, 18, 20, 22 and 24 of the guided movement platform 10, or any other data receiver. The mote data may include a time and/or date that the data related to a parameter was acquired.

The mote 118 may include a unique identifier, and is operable to communicate the identifier in an association with its sensed parameter. The mote 118 may include a configuration that determines its location, for example, by a GPS system such as the global positioning system 24, by triangulation relative to a known point, or by communication with other motes 118. The location of the mote 118 may be a known parameter established previously. Similarly, location identification may be associated with data originated and/or forwarded by the mote 118.

As shown in FIGS. 9, 10A, 10B and 10C, mote 118 or a network of motes 118 may be on the intelligent walking stick 64 itself, on the intelligent wheelchair 66 itself, on the intelligent walker 68 itself, or on the housing of the guided movement platform 10 itself, whether or not the guided movement platform 10 is being used as a portable on-person sensor apparatus 152 or is engaged to one of the intelligent walking stick 64, intelligent wheelchair 66, or intelligent walker 68.

The mote system 12 may include one of a mote 118 and network of motes 118 in an environment through which the guided movement platform 10 is moving. These motes 118 are environmental motes 118 that are fixed or embedded, for example, in structures found in a shopping mall or along a sidewalk.

The mote system 12 includes one of a mote 118 and network of motes 118 that move through the environment with the guided movement platform 10. These motes 118 are housing motes 118 that are engaged to the housing of the guided movement platform 10 or are in or on the structure of the intelligent walking stick 64, intelligent wheelchair 66, or intelligent walker 68.

Six or more of the embodiments of the mote 118 have been described above where, in the embodiments of a mote 118, components differ. Such components may be interchanged among the motes 118 and among the embodiments of the motes 118. One or more components may be eliminated from some embodiments. One or more components may be added to some embodiments.

As to the mote system 22 and mote 118 and the guided movement platform 10, the Ferri et al. U.S. Pat. No. 8,041,834 B2 issued Oct. 18, 2011 and entitled System And Method For Enabling A Wireless Sensor Network By Mote Communication is hereby incorporated by reference in its entirety.

As to the mote system 22 and mote 118 and the guided movement platform 10, the Jung et al. U.S. Pat. No. 8,271,449 B2 issued Sep. 18, 2012 and entitled Aggregation And Retrieval Of Mote Network Data is hereby incorporated by reference in its entirety.

The Global Positioning System 24

Figure 8:
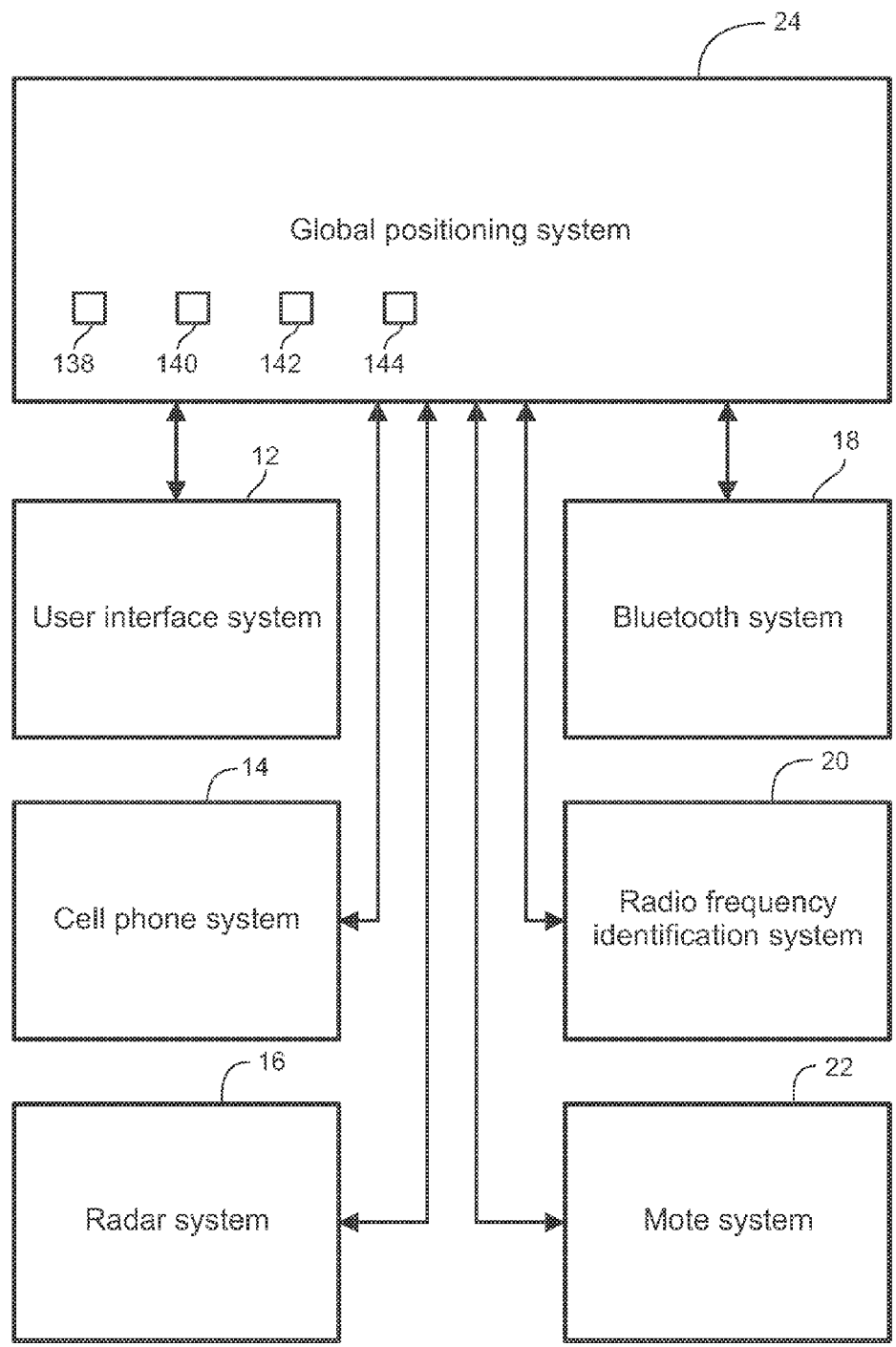
FIG. 8 is a diagrammatic view of the global positioning system of the guided movement platform of FIG. 1 being in communication with each of the other systems of the guided movement platform of FIG. 1.

FIG. 8 shows a diagrammatic view of the global positioning system 24 of the guided movement platform 10 of FIG. 1 being in communication, such as one way or two way communication, with each of the other systems of the guided movement platform 10 of FIG. 1. Such communication may be hard wired or wireless.

The global positioning system 24 includes a GPS receiver 138 that provides a pedestrian user with a) location, distance and directional information, and b) tracking and route creation. Between 24 and 32 satellites orbit the Earth, and these satellites provide the answer to a question asked by the GPS receiver 138, with the question being: "Where am I?" The satellites calculate this through a process called trilateration. A GPS receiver 138 locks signals with several different satellites orbiting the Earth, and based on the time it took those signals to reach the different satellites, a calculation is made about the location of the GPS receiver 138 on Earth.

The GPS system 24, having GPS technology, enables the pedestrian user to create a path to walk or a route to travel. Laying a track is an important skill that can be learned using a GPS receiver 138. A pedestrian user can employ the GPS system 24, having the GPS receiver 138, to leave a virtual trail. This trail will permit the pedestrian user to follow his or her trail out of a location if the pedestrian user becomes lost. When a pedestrian user employs the tracking feature, the pedestrian user needs not to manually enter the track points. Instead, the GPS system 24, including the GPS receiver 138, automatically marks the track points for the pedestrian user at a distance the pedestrian user specifies before the pedestrian user's trip.

The GPS system 24, or the guided movement platform 10 as a whole, may include infrared technology 140 including an infrared camera. This infrared technology element 140 can include or employ short audio signals sent by invisible infrared light beams from permanently installed transmitters to a hand-held receiver that decodes the signal and delivers a voice message through a speaker or headset or through the user interface system 12 or cell phone system 14. The infrared technology element 140 identifies landmarks around the pedestrian user and sends him or her short messages telling what's ahead, whereby the pedestrian user may employ the GPS system 24 to plan a route about such a landmark or obstacle.

The GPS system can include a GPS-compatible cell phone 142. The cell phone 142 can be one unit with different levels of complexity for the phone's software (i.e., the amount of features available), which would be decided upon by the specific pedestrian user.

The GPS system 24 can include GPS-steering software 144 that enhances visibility when snow, rain, or fog obscures the actual view. If the visually impaired pedestrian user strays from the guided path, the GPS-steering software 144 can gently guides the pedestrian user back to the on-course path.

The GPS steering software 144 can guide the visually impaired pedestrian user while avoiding obstacles.

As to GPS system 24 and guided movement platform 10, the Schuchman et al. U.S. Pat. No. 5,726,893 issued Mar. 10, 1998 and entitled Cellular Telephone With Voice-In-Data Modem is hereby incorporated by reference in its entirety.

As to GPS system 24 and guided movement platform 10, the Hall et al. U.S. Pat. No. 5,539,398 issued Jul. 23, 1996 and entitled GPS-Based Traffic Control Preemption System is hereby incorporated by reference in its entirety.

As to GPS system 24 and guided movement platform 10, the Karaoguz et al. U.S. Pat. No. 7,480,514 B2 issued Jan. 20, 2009 and entitled GPS Enabled Cell Phone With Compass Mode Mapping Function is hereby incorporated by reference in its entirety.

The Intelligent Walking Stick 64, the Intelligent Wheelchair 66, the Intelligent Walker 68, and Intelligent Pointer 148

Figure 9:
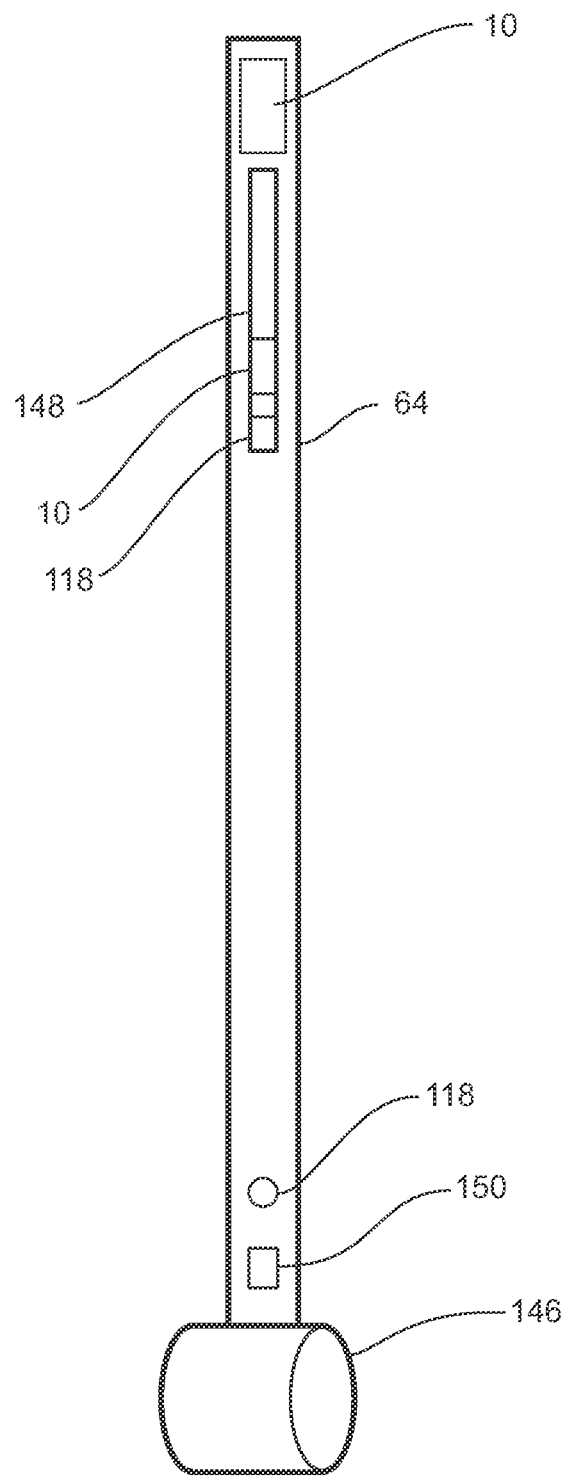
FIG. 9 is a diagrammatic view of an intelligent walking stick having the guided movement platform of FIG. 1 and further shows an intelligent pointer engaged to the intelligent walking stick.

FIG. 9 shows a diagrammatic view of an intelligent walking stick 64 having the guided movement platform 10 of FIG. 1.

The intelligent walking stick 64 is an elongate stick having a rolling spinnable wheel or sphere or other rolling object 146 at the distal end of the stick 64. The rolling spinnable wheel 64 is motorized or self-propelled. The rolling spinnable wheel 64 may pull the stick 64 forwardly (and thus the pedestrian user forwardly), may push the stick 64 rearwardly (and thus the pedestrian user rearwardly), may turn the stick 64 to the right (and thus guide the pedestrian user to the right), and/or may turn the stick 64 to the left (and thus guide the pedestrian user to the left). The rolling spinnable wheel 64 may stop rolling and stop spinning to stop the stick 64 (and thereby stop the pedestrian user) or may begin to roll and/or spin (and thereby begin to pull, push, turn and guide the pedestrian user).

The intelligent walking stick 64: a) gently pulls, pushes, and steers the pedestrian user in reaching requested destinations, safely crossing streets, navigating inclines and declines, dips and rises, obstacles and hazards, low hanging hazards, following electronic paths, and other environmental features, b) disallows tampering with functions of the intelligent walking stick, c) warns when a vehicle is dangerously close, d) recognizes traffic signals and advises when it is safe for a pedestrian user (individual who is using the intelligent walking stick 64 or carrying or wearing on-person sensors 152 such as shown in FIG. 10C) to cross, e) warns (advises) surrounding vehicles when a user is crossing the street, f) generates dynamic images that overlay on glasses, goggles, shields, and screens, g) preempt a set of traffic lights when danger is imminent, h) transmits images and audible information, such as street names, i) activates an automatic emergency alert component, j) emits a radio signal for the detection, identification, and location of pedestrian users such as visually impaired and dementia patients, and k) converts sensed and imaged scenes into dynamic, visible and audible displays, providing information and "sight." It should be noted that the intelligent wheelchair 66 and intelligent walker 68 can also perform the above functions with rollable and spinnable wheels. It should be noted that the on-person guided movement platform 10 shown in FIG. 10C with the on-person sensor apparatus 152 can also perform the above functions where the above functions do not relate to rolling and spinning wheels.

The guided movement platform 10, whether engaged to intelligent walking stick 64, intelligent wheelchair 66, intelligent walker 68: a) performs video analysis and automated video monitoring, b) employs computer vision algorithms to analyze camera images and extract information, c) activates automatic processing of data, d) selects an alternative path to circumvent hazards sensed several feet ahead by automatically initiating necessary changes in direction, e) after evading the hazard or hazards, continues targeting the originally requested destination, recalibrating as necessary, f) if an acceptable path is not detected, the rollable and spinnable motorized wheel will come to a stop, g) initiates a counter-thrust to assist in maintaining balance, h) initiates and advises appropriate, predetermined and computer learned actions in response to sensed information and verbal instructions, i) detects, identifies, locates, and displays sensed and imaged scenes, j) converts information into verbal communication, k) always employs more than one camera when the cane is in motion, l) predicts, detects, and circumvents hazards and obstacles, m) assists in maintaining balance, n) accepts and attaches other platforms, o) uploads bus and train routes through a server onto one's personal computer, p) finds private residences, overnight accommodations, attractions, and restaurants, q) receives instantaneous information regarding one's whereabouts, and r) records voice memos, checks e-mail, listens to music to, for example, automatically advise of a particular radio station or that a particular song is being played by a radio station, and picks up and amplifies music being played in a local park. The guided movement platform 10 when in a housing and carried on a belt as an on-person sensor apparatus 152 as shown in FIG. 10C can also perform the above functions where the above functions do not require a rollable and spinnable wheel.

The intelligent walking stick 64 is constructed such that: a) the motorized wheel 146 spins in universal directions, b) the motorized wheel 146 is approximately 2¼" in width to add stability for those pedestrian users needing a regular cane and the intelligent walking stick 64 simultaneously, c) the wheel 146 is sufficiently large to move through light underbrush, d) the wheel 146 is sufficiently soft to absorb most surface roughness and noise, e) the motorized wheel 146 is sufficiently strong to support an individual as the spin momentum from a counter-thrust moves the sensed off-balance pedestrian user and the cane itself (180 degrees or ½ turn) to an upright position and stops such that the pedestrian user maintains his or her balance, f) small repeated pulsations can be provided at certain times through the frame of the intelligent walking stick 64 as a warning, g) when the intelligent walking stick 64 of the pedestrian user moves too far from upright, but before reaching the sensed likelihood of falling, a pulsation or small repeated pulsations are triggered in the handle of the intelligent walking stick 64, urging a move to a more upright stance, and h) a processor receives the radar sensed data from a sensor or sensors, compares the data with a predetermined standard, and initiates pulsations in the handle of the cane when, for example, the intelligent walking stick 64 moves too far from upright.

The intelligent walking stick 64 may optionally deliver a counter-thrust. Algorithms interpret the risk of falling as the pedestrian user leans more and more away from upright (beyond the pulsation warnings) and determine when to initiate a counter-thrust and the momentum required. The processor compares the data with a predetermined standard, and initiates a counter-thrust. The spin direction of the motorized wheel 146 is reversed, slowing or thwarting an pedestrian user's fall. That is, the intelligent walking stick 64 spins the off-balance pedestrian user and the intelligent walking stick 64 itself 180 degrees or ½ turn to an upright position and stops.

The frame of the intelligent walking stick 64 is sufficiently strong to support an individual as the spin momentum from a counter-thrust moves the sensed off-balance pedestrian user and the intelligent walking stick 64 itself (180 degrees or ½ turn) to an upright position.

Frames of the intelligent walking stick 64 may be available in different sizes or adjustable in size.

A light 150 on the intelligent walking stick 64 that shines on the ground will suggest to local pedestrians to allow the pedestrian user to move by freely.

A flashing light 150 from the intelligent walking stick 64 will signal a visually impaired pedestrian user is crossing the street.

Features of the intelligent walking stick requiring manual action by the impaired pedestrian user may be positioned for easy access with appropriate lighting.

Power to light and/or sound is connected to two separate on/off switches on the intelligent walking stick 64. Power always comes on when the intelligent walking stick 64 is first activated.

The battery of the intelligent walking stick is light weight and able to function most of the day.

The battery of the intelligent walking stick charges on a 120 volt AC outlet.

The intelligent walking stick 64 stands upright when not in use.

FIG. 9 shows an intelligent pointer 148 engaged to the intelligent walking stick 64. The intelligent pointer 148 is shorter in length than the intelligent walking stick 64. The intelligent pointer 148 has a thickness or diameter less than the respective thickness or diameter of the intelligent walking stick 64.

The intelligent walking stick 64 can engage the intelligent pointer 148 with Velcro® (fabric hooks and loops) or with releasable clamps or by some other mechanical or magnetic mechanism. In turn, the intelligent pointer 148 can be a holder of silverware such as forks, spoons and knives, by engaging the silverware with Velcro® (fabric hooks and loops) or with releasable clamps or by some other mechanical or magnetic mechanism.

The intelligent pointer 148 or silverware holder 148 may include the guided movement platform 10 or one or more features of systems 12, 14, 16, 18, 20, 22, 24 of the guided movement platform 10. The intelligent pointer 148 may use the guided movement platform 10 of the intelligent walking stick 64, intelligent wheelchair 66, walker 68, or the guided movement platform 10 of the on-person sensor apparatus 152 shown in FIG. 10C.

The intelligent pointer 148 may employ one or more of the systems 12, 14, 16, 18, 20, 22 and 24. The intelligent pointer 148 may especially employ the global positioning system 24, the cell phone system 14, and the radio frequency identification system 20. Tags 116 may be engaged with money, medication clothing, food, cookware, watches, and clocks and thus the intelligent pointer 148, having a reader 114 in or near the distal end of the intelligent pointer 148, may facilitate the identifying of money, taking of medication, matching clothing, cooking, and telling time, as well as aid in daily living and working in a number of other ways. It should be noted that the reader 114 need not be in the distal end of the intelligent pointer 148 since a visually impaired person may be incapable of pointing directly at an object having a tag 116.

As indicated above, RFID technology, including the RFID system 20, has at least two components: the reader 114 and the tag 116. The reader 114 has two parts—a transceiver and an antenna 112. The transceiver generates a weak radio signal that may have a range from a few feet to a few yards. The signal is necessary to awaken the RFID tag 116 and is transmitted through the antenna 112. The signal itself is a form of energy that can be used to power the tag 116.

The RFID (radio frequency identification) system 20, includes the presence of a microchip, antenna 112, and reader 114, where the reader 114 sends out electromagnetic waves which are received by the antenna 112 and converted to digital data by the microchip. That is, with sensed data received, the intelligent pointer 148, with predetermined standards, sends identification data to the antenna 112, which converts the data into visually enhanced images, and audibly describes, for example, the different foods and their respective positions on the plate (or table) of the visually impaired. The intelligent pointer 148, which may include the global positioning system 24, the cell phone system 14, and the radio frequency identification system 20 including tags 116, facilitates the identifying of money, taking of medication, matching clothing, cooking, and telling time. The intelligent pointer 148 also generates a signal to identify, for example, stairs and obstacles around the house and elsewhere. The intelligent pointer 148 also generates a signal to announce the nearness of stairs and if the stairs are going up or down, relative to the location of the pedestrian user. The intelligent pointer 148 also generates a signal to announce the nearness of obstacles around the house and elsewhere.

A mote or network of motes 118 may be engaged in or on the intelligent pointer 148.

In operation, the guided movement platform 10 may provide instructions to the pedestrian user whereupon the pedestrian user may walk through or navigate an environment without being propelled by any of the intelligent walking stick 64, intelligent wheelchair 66 or walker 68. That is, the guided movement platform 10 is engaged to the stick 64, wheelchair 66 or walker 68 and providing instructions to the pedestrian user but the pedestrian user himself or herself is providing the power to walk. Alternatively, the guided movement platform 10 may automatically navigate the environment for the pedestrian user and guide the pedestrian user by automatically propelling the intelligent walking stick 64, the intelligent wheelchair 66 or intelligent walker 68. Still further, there may be a combination of automatic navigation and pedestrian user navigation through an environment depending upon the information provided to the pedestrian user from the systems 12, 14, 16, 18, 20, 22 and 24 of the guided movement platform 10.

As to the guided movement platform 10, intelligent walking stick 64, intelligent wheelchair 66, intelligent walker 68, and intelligent pointer 148, and the systems 12, 14, 16, 18, 20 22 and 24 of the guided movement platform 10, the following patents are hereby incorporated by reference in their entireties: a) the Ellis U.S. Pat. No. 5,973,618 issued Oct. 26, 1999 and entitled Intelligent Walking Stick, b) the Mattes et al. U.S. Pat. No. 8,127,875 B2 issued Mar. 6, 2012 and entitled Power Driven Wheelchair, c) the Fehr et al. U.S. Pat. No. 6,842,692 issued Jan. 11, 2005 and entitled Computer-Controlled Power Wheelchair Navigation System, d) the Hickman et al. U.S. Pat. No. 3,872,945 issued Mar. 25, 1975 and entitled Motorized Walker, e) the Irvine U.S. Pat. No. 8,172,023 B1 issued May 8, 2012 and entitled Personal Mobility Device, f) the Chang et al. U.S. Pat. No. 8,627,909 B2 issued Jan. 14, 2014 and entitled Walking-Assistant Device, and g) the Lathrop U.S. Pat. No. 5,524,720 issued Jun. 11, 1996 and entitled Powered Walker Having Integrated Parallel Bars.

Discussions herein utilizing terms such as, for example, "processing", "computing", "calculating", "determining", "establishing", "analyzing", "checking", or the like, may refer to an operation or operations and/or a process or processes of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. An intelligent walking stick having a guided movement platform for guiding a pedestrian user through an environment, comprising:

a) a cell phone system, wherein the pedestrian user interacts with the cell phone system by at least one of speech, hearing, touch, and sight, wherein the cell phone system converts information received from at least one other system into a verbal communication, wherein the cell phone system converts a verbal communication into a form of communication that deploys an action with at least one other system, wherein the cell phone system is configured to automatically receive mapping information on the environment of the pedestrian user;

b) a radar system that detects objects in the environment in real time, wherein the radar system includes a transponder and a transducer, wherein radar signal data received by the radar system is compared with predetermined standards to deploy an action with at least one other system;

c) a wireless control and communication system that manages communication between at least two other systems;

d) a radio frequency identification system that reads tags in the environment, wherein the radio frequency identification system includes a reader, and wherein the environment includes a tag, and wherein the radio frequency identification system communicates information received from the tag to at least one other system;

e) a mote system, wherein the mote system includes one of a mote and network of motes; and f) a global positioning system;

h) wherein at least one system includes a processor;

i) wherein each system is in communication with at least one other system;

j) wherein at least one of said systems is engaged on the intelligent walking stick, the intelligent walking stick further having a mote with communication, computation, and sensing elements, such that the pedestrian user is aided in navigating the environment;

wherein the intelligent walking stick comprises a distal end and a wheel engaged at the distal end, the wheel being motorized and rolling such that the wheel may pull the intelligent walking stick and pedestrian user forwardly and rearwardly, the wheel being spinnable in universal directions so as to turn the intelligent walking stick to the right and to the left such that the spin direction of the wheel is reversed so as to deliver a counter thrust to slow or thwart a fall of the pedestrian user and, optionally, including algorithms to interpret a risk of falling as the pedestrian user leans more and more away from the upright, beyond pulsation warnings, to determine when to initiate said counter thrust.

2. The intelligent walking stick of claim 1, wherein the wireless control and communication system is a Bluetooth system.

3. The intelligent walking stick of claim 1, wherein the mote system includes a sensor node, wherein the sensor node includes a microcontroller, transceiver, external memory, power source, and at least one sensor.

4. The intelligent walking stick of claim 1, and further comprising an intelligent pointer having a reader and capable of reading a tag.

5. The intelligent walking stick of claim 1, wherein the processor is one of a computer, microcontroller and microprocessor.

6. The intelligent walking stick of claim 1, wherein said one of a mote and network of motes is found in an environment through which the guided movement platform is moving.

7. The intelligent walking stick of claim 1, wherein said one of a mote and network of motes moves through the environment with the guided movement platform.

8. The intelligent walking stick of claim 4, wherein the intelligent pointer is removably attached to the intelligent walking stick, the intelligent pointer being shorter in length than the intelligent walking stick, the intelligent walking stick including one of a) said guided movement platform of said intelligent walking stick and b) features of said global positioning system, said cell phone system, and said radio frequency identification system, c) whereby said intelligent pointer facilitates identification of money, taking of medication, matching clothing, cooking, and telling time.

9. The intelligent walking stick of claim 1, wherein the radar system includes laser radar.

10. The intelligent walking stick of claim 1, wherein the radar system includes computer vision algorithms that analyze camera images.

11. The intelligent walking stick of claim 1, wherein the radar system includes intelligent video that performs video analysis.

12. The intelligent walking stick of claim 1, wherein the mote system automatically processes data and fuses information from multiple sensors.

13. The intelligent walking stick of claim 1, and further comprising an infrared technology element that includes short audio signals sent by infrared light beams that are decoded and delivered to the cell phone system.

14. The intelligent walking stick of claim 1, wherein the global positioning system communicates with the wheel to guide the pedestrian user.

15. The intelligent walking stick of claim 1, wherein the guided movement platform stops the wheel if an acceptable path is not detected.

16. An intelligent walking stick having a guided movement platform for guiding a pedestrian user through an environment, comprising:

a) a cell phone system, wherein the pedestrian user interacts with the cell phone system by at least one of speech, hearing, touch, and sight, wherein the cell phone system converts information received from at least one other system into a verbal communication, wherein the cell phone system converts a verbal communication into a form of communication that deploys an action with at least one other system, wherein the cell phone system is configured to automatically receive mapping information on the environment of the pedestrian user;

b) a radar system that detects objects in the environment in real time, wherein the radar system includes a transponder and a transducer, wherein radar signal data received by the radar system is compared with predetermined standards to deploy an action with at least one other system;

c) a wireless control and communication system that manages communication between at least two other systems;

d) a radio frequency identification system that reads tags in the environment, wherein the radio frequency identification system includes a reader, and wherein the environment includes a tag, and wherein the radio frequency identification system communicates information received from the tag to at least one other system;

e) a mote system, wherein the mote system includes one of a mote and network of motes; and f) a global positioning system;

h) wherein at least one system includes a processor;

i) wherein each system is in communication with at least one other system;

j) wherein at least one of said systems is engaged on the intelligent walking stick, the intelligent walking stick further having a mote with communication, computation, and sensing elements, such that the pedestrian user is aided in navigating the environment;

wherein the intelligent walking stick includes a handle, the handle being a pulsating handle that pulsates as a warning and, optionally, triggering pulsation when said intelligent walking stick moves too far from upright and before reaching a sensed likelihood of falling so as to urge a move to a more upright stance.

* * * * *